US012775952B2

(12) United States Patent
Gupta et al.

(10) Patent No.: US 12,775,952 B2
(45) Date of Patent: Oct. 27, 2026

(54) METHODS AND SYSTEMS FOR DETERMINING RISK ASSOCIATED WITH TOKENIZATION OF PAYMENT CARDS

(71) Applicant: MASTERCARD INTERNATIONAL INCORPORATED, Purchase, NY (US)

(72) Inventors: Sonia Gupta, Gurgaon (IN); Nikhil Tumbde, Nagpur (IN); Siddhartha Asthana, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/909,485

(22) Filed: Oct. 8, 2024

(65) Prior Publication Data

US 2026/0099847 A1 Apr. 9, 2026

(51) Int. Cl.
*G06Q 40/00* (2023.01)
*G06Q 20/38* (2012.01)
*G06Q 20/40* (2012.01)

(52) U.S. Cl.
CPC ..... *G06Q 20/4016* (2013.01); *G06Q 20/3825* (2013.01)

(58) Field of Classification Search
CPC ....................... G06Q 20/4016; G06Q 20/3825
See application file for complete search history.

(56) References Cited

U.S. PATENT DOCUMENTS 9,563,895 B2 * 2/2017 Bondesen .......... G06Q 20/3821
10,460,322 B2 * 10/2019 Williamson ....... G06Q 20/4097
10,491,389 B2 11/2019 Girish
(Continued)

FOREIGN PATENT DOCUMENTS

WO 2023150137 8/2023

OTHER PUBLICATIONS

National Cyber Security Centre (Transaction Monitoring for online services, https://www.ncsc.gov.uk/guidance/transaction-monitoring-for-online-services#section_4, Mar. 2, 2022 p. 6, after first paragraph) (Year: 2022).*

*Primary Examiner* — Mark H Gaw
(74) *Attorney, Agent, or Firm* — Pillsbury Winthrop Shaw Pittman LLP

(57) ABSTRACT

Methods and systems for determining risk associated with tokenization of payment cards are disclosed. The method performed by a server system includes receiving a tokenization request message requesting for a tokenization of a payment card of a cardholder for a particular merchant from a token requester. The tokenization request message includes card credential information. Further, the method includes accessing a cardholder-token feature set corresponding to the cardholder and a token requester feature set corresponding to the token requester from a database associated with the server system based, at least in part, on the card credential information. Furthermore, the method includes generating, by a Machine Learning (ML) model associated with the server system, a risk score indicating a risk corresponding to a transaction associated with the tokenization request message based, at least in part, on the cardholder-token feature set, the token requester feature set, and scoring criteria.

20 Claims, 9 Drawing Sheets

(56) References Cited

U.S. PATENT DOCUMENTS

| | | | | |
|---|---|---|---|---|
| 11,151,566 | B2 | 10/2021 | Chan-Bauza et al. | |
| 12,450,608 | B2 * | 10/2025 | Thomas | G06N 20/00 |
| 2015/0142673 | A1 | 5/2015 | Nelsen et al. | |
| 2018/0174137 | A1 | 6/2018 | Subbarayan et al. | |
| 2021/0217005 | A1 * | 7/2021 | Mehrhoff | G06Q 20/4014 |
| 2023/0196374 | A1 * | 6/2023 | Singh | G06Q 20/4016<br>705/44 |
| 2024/0013177 | A1 | 1/2024 | Sindi et al. | |
| 2024/0070655 | A1 * | 2/2024 | Puehse | G06Q 20/20 |

* cited by examiner

METHODS AND SYSTEMS FOR DETERMINING RISK ASSOCIATED WITH TOKENIZATION OF PAYMENT CARDS

TECHNICAL FIELD

The present disclosure relates to artificial intelligence-based processing systems and, more particularly, to electronic methods and complex processing systems for determining risk associated with tokenization of payment cards.

BACKGROUND

With the advent of technology, payment methods have evolved significantly over time, from traditional cash transactions to modern digital payment systems, revolutionizing the way businesses work. A reliable payment system facilitating quick, secure, and seamless processing of payment transactions is the backbone of any commercial activity. It enables businesses or merchants to accept payments from cardholders, pay suppliers, and manage their finances effectively. Alongside, it also enables cardholders to make quick and seamless payments. For example, when a cardholder visits a shop, taps a payment card (e.g., debit card, credit card, etc.) or a mobile device on a reader, within a few seconds the cardholder's credentials are authenticated, and the transaction is authorized. This type of transaction is also referred to as a Card-present (CP) transaction. In the case of an online transaction (i.e., a Card—not-present (CNP) transaction), the cardholder enters the credentials while checking out on a merchant's platform. With time, merchants enabled the storage of cardholder payment credentials on their platforms to eliminate the need for re-entering details for each transaction. However, the risk of data breaches, identity theft, and financial fraud has grown exponentially, targeting merchants' platforms to steal cardholder's information. As a result, all the players in the payment ecosystem, i.e., cardholders, merchants, and issuers face huge financial losses.

To address this problem, tokenization of the sensitive credentials of the cardholders is introduced. Tokenization refers to the replacement of a cardholder's Primary Account Number (PAN) with a randomly generated alternative number (i.e., a token). Tokenization ensures that actual card information is not shared with the merchants for both the CP and CNP types of transactions. Rather, the information is stored in the form of tokens. Tokenization can be initiated by the cardholder or the issuing bank, but it is authorized and enabled by the issuing bank. Thus, tokenization provides a better user experience with greater safety and security. However, fraudsters can use social engineering, phishing scams, hacked wireless fidelity (Wi-Fi) networks, dark websites, and other scams to get access to cardholder's sensitive information and illegitimately provision tokens. Once the token is provisioned to a device of the fraudsters, it is difficult for the issuing bank to authorize the token requester since the fraudster is impersonating the authorized cardholder. Fraudsters engage in token provisioning fraud by linking stolen card credentials with their digital wallets on their mobile devices. Moreover, when excessive trust is placed in digital wallets, transactions through newly linked tokens are approved at higher rates in comparison to alternative modes of transactions. Consequently, the fraudsters can execute several transactions quickly before the fraudulent behavior is noticed, even in a shorter amount of time. As a result, a huge loss is experienced not only by the cardholder but also by the merchant, issuing bank, acquiring bank, and other players in the payment network.

Thus, there exists a need for technical solutions, such as improved methods and systems for determining risk associated with the tokenization of payment cards while overcoming the aforementioned technical drawbacks.

SUMMARY

Various embodiments of the present disclosure provide methods and systems for determining risk associated with tokenization of payment cards.

In an embodiment, a computer-implemented method for determining risk associated with tokenization of payment cards is disclosed. The computer-implemented method performed by a server system includes receiving a tokenization request message requesting for a tokenization of a payment card of a cardholder for a particular merchant from a token requester. The tokenization request message includes card credential information. Further, the computer-implemented method includes accessing a cardholder-token feature set corresponding to the cardholder and a token requester feature set corresponding to the token requester from a database associated with the server system based, at least in part, on the card credential information. Furthermore, the computer-implemented method includes generating, by a Machine Learning (ML) model associated with the server system, a risk score indicating a risk corresponding to a transaction associated with the tokenization request message based, at least in part, on the cardholder-token feature set, the token requester feature set, and scoring criteria.

In another embodiment, a server system is disclosed. The server system includes a communication interface and a memory including executable instructions. The server system also includes a processor communicably coupled to the memory. The processor is configured to execute the instructions to cause the server system, at least in part, to receive a tokenization request message requesting for a tokenization of a payment card of a cardholder for a particular merchant from a token requester. The tokenization request message includes card credential information. Further, the server system is caused to access a cardholder-token feature set corresponding to the cardholder and a token requester feature set corresponding to the token requester from a database associated with the server system based, at least in part, on the card credential information. Furthermore, the server system is caused to generate, by a Machine Learning (ML) model associated with the server system, a risk score indicating a risk corresponding to a transaction associated with the tokenization request message based, at least in part, on the cardholder-token feature set, the token requester feature set, and scoring criteria.

In yet another embodiment, a non-transitory computer-readable storage medium is disclosed. The non-transitory computer-readable storage medium includes computer-executable instructions that, when executed by at least a processor of a server system, cause the server system to perform a method. The method includes receiving a tokenization request message requesting for a tokenization of a payment card of a cardholder for a particular merchant from a token requester. The tokenization request message includes card credential information. Further, the method includes accessing a cardholder-token feature set corresponding to the cardholder and a token requester feature set corresponding to the token requester from a database associated with the server system based, at least in part, on the card credential information. Furthermore, the method includes generating, by a Machine Learning (ML) model associated with the server system, a risk score indicating a risk corresponding to a transaction associated with the tokenization request message based, at least in part, on the cardholder-token feature set, the token requester feature set, and scoring criteria.

BRIEF DESCRIPTION OF THE FIGURES

For a more complete understanding of example embodiments of the present technology, reference is now made to the following descriptions taken in connection with the accompanying drawings in which.

Figure 1:
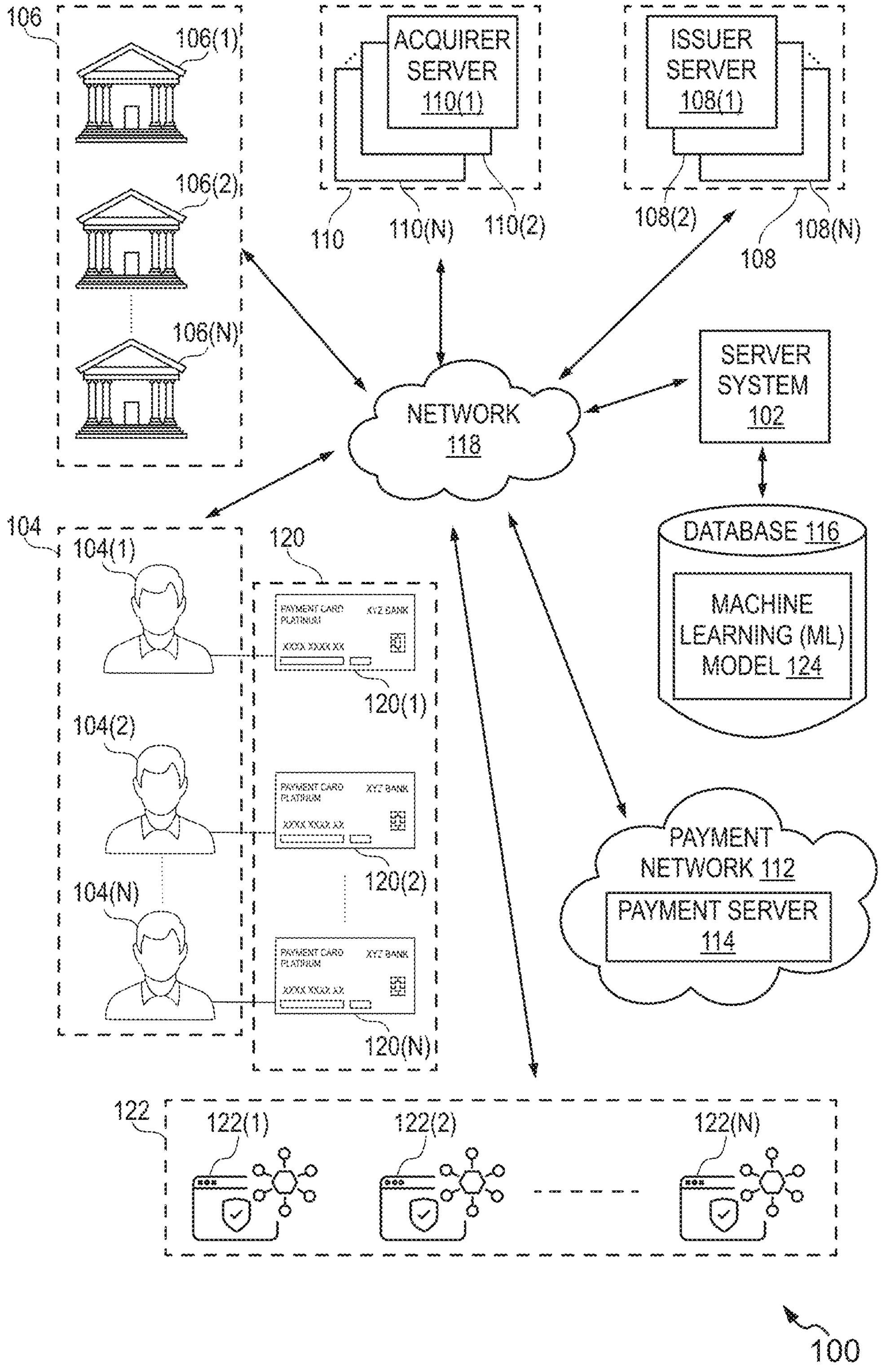
FIG. 1 illustrates a schematic representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Embodiments of the present disclosure may be embodied as an apparatus, a system, a method, or a computer program product. Accordingly, embodiments of the present disclosure may take the form of an entire hardware embodiment, an entire software embodiment (including firmware, resident software, micro-code, etc.), or an embodiment combining software and hardware aspects that may all generally be referred to herein as a "circuit", "engine", "module", or "system". Furthermore, aspects of the present disclosure may take the form of a computer program product embodied in one or more computer-readable storage media having computer-readable program code embodied thereon.

For elucidatory purposes, the terms "tokenization" and "digitization" have been used interchangeably throughout the description and generally refer to replacement of a cardholder's Primary Account Number (PAN) with a randomly generated alternative number (i.e., a token). On the other hand, the term "token provisioning" used throughout the description generally refers to the process that delivers the token or tokenized card details to a device, a server, or a digital wallet. Further, the term "tokenized transaction" refers to a payment transaction performed using a token generated for a payment card that is used to perform the corresponding transaction.

Further, the term "token requester" used throughout the description generally refers to an entity that initiates a tokenization process by requesting a token for a transaction from a card network (otherwise also referred to as a 'payment network'). Token requestors accept requests from cardholders for tokenization of their payment cards and pass it on to the payment network to issue a corresponding token for each payment card.

Furthermore, the terms "cardholder", "user", "account holder", "consumer", and "buyer" are used interchangeably throughout the description and refer to a person who has a payment account or at least one payment card (e.g., credit card, debit card, etc.). The payment card may or may not be associated with the payment account and will be used by a merchant to complete the payment transaction initiated by the cardholder. The payment account may be opened via an issuing bank or an issuer server.

The term "merchant", used throughout the description generally refers to a seller, a retailer, a purchase location, an organization, or any other entity that is in the business of selling goods or providing services. Moreover, it can refer to either a single business location or a chain of business locations of the same entity.

The term “payment account” used throughout the description refers to a financial account that is used to fund a financial transaction. Examples of the financial account include, but are not limited to, a savings account, a credit account, a checking account, and a virtual payment account.

The terms “payment transaction”, “financial transaction”, “e-commerce transaction”, “digital transaction”, and “transaction” are used interchangeably throughout the description and refer to a transaction of a payment of a certain amount being initiated by the cardholder.

The term “issuer”, used throughout the description, refers to a financial institution normally called an “issuer bank” or “issuing bank” in which an individual or an institution may have an account. The issuer also issues a payment card, such as a credit card, a debit card, etc. Further, the issuer may also facilitate online banking services, such as electronic money transfer, bill payment, etc., to the cardholders through a server which is called “issuer server” throughout the description.

The term “acquirer”, used throughout the description, refers to a financial institution (e.g., a bank) that processes financial transactions for merchants. In other words, this can be an institution that facilitates the processing of payment transactions for physical stores, merchants, or institutions that own platforms that make either online purchases or purchases made via software applications possible (e.g., the shopping cart platform providers and the in-app payment processing providers).

The terms “payment network” and “card network” are used interchangeably throughout the description and refer to a network or collection of systems used for the transfer of funds using cash substitutes. Payment networks may use a variety of different protocols and procedures to process the transfer of money for various types of transactions. Payment networks are companies that connect an issuing bank with an acquiring bank to facilitate online payment. It is to be noted that the payment networks are operated by organizations that are called “payment processors” throughout the description.

The terms “payment card” and “card” are used interchangeably throughout the description and refer to a physical or virtual card that may or may not be linked with a financial or payment account. It may be presented to a merchant or any such facility to fund a financial transaction via the associated payment account. Examples of payment cards include, but are not limited to, debit cards, credit cards, prepaid cards, virtual payment numbers, virtual card numbers, forex cards, charge cards, e-wallet cards, and stored-value cards.

Overview

Various embodiments of the present disclosure provide methods, systems electronic devices, and computer program products for determining risk associated with tokenization of payment cards. In a specific embodiment, a server system may be embodied within a payment server associated with a payment network. In one embodiment, the present disclosure describes the server system that is configured to receive a tokenization request message requesting for a tokenization of a payment card of a cardholder for a particular merchant from a token requester. The tokenization request message may include card credential information.

In another embodiment, the server system is configured to access a cardholder-token feature set corresponding to the cardholder. The server system may also access a token requester feature set corresponding to the token requester. The server system may access these feature sets from a database associated with the server system based, at least in part, on the card credential information.

In yet another embodiment, the server system is configured to generate a risk score indicating a risk corresponding to a transaction associated with the tokenization request message based, at least in part, on the cardholder-token feature set, the token requester feature set, and scoring criteria. In a non-limiting implementation, the server system may generate the risk score using a Machine Learning (ML) model associated with the server system.

In a specific embodiment, to generate the risk score, the server system accesses a training feature set for each transaction from the database based, at least in part, on the cardholder-token feature set and the token requester feature set for each transaction. Further, the server system may train the ML model to generate the risk score for the transaction associated with the tokenization request message. Herein, training the ML model may include iteratively performing a set of operations until convergence criteria are met. The set of operations may include: (i) initializing the ML model based, at least in part, on one or more model parameters; (ii) generating, by the ML model, a predicted probability score for each transaction based, at least in part, on the training feature set and the one or more model parameters, the predicted probability score indicating a likelihood of the transaction being risky; (iii) computing, by the ML model, a loss for each transaction based, at least in part, on the predicted probability score, true labels, and a loss function; and (iv) optimizing the one or more model parameters based, at least in part, on back-propagation of the loss.

Moreover, in a non-limiting implementation, to generate the risk score, the server system may generate a predicted probability score based, at least in part, on the cardholder-token feature set and the token requester feature set. Herein, the predicted probability score is indicative of a likelihood of the transaction associated with the tokenization request message being risky. The server system may generate the predicted probability score for the transaction using the ML model. Later, the server system may generate the risk score for the transaction associated with the tokenization request message based, at least in part, on the predicted probability score and the scoring criteria.

Further, the server system may facilitate transmission of the tokenization request message including the risk score to an issuer associated with the payment card for an approval for the tokenization of the payment card. In response to receiving a first tokenization response message indicative of an approval for the tokenization from the issuer, the server system generates a token for the payment card. The token may be generated randomly. Further, the server system extracts the card credential information of the payment card from the tokenization request message. Later, in an embodiment, the server system links and stores an identifier of the payment card with the corresponding token in the database, based at least on the card credential information. Then, the server system facilitates the transmission of the token linked with the identifier of the payment card to the token requester. Alternatively, in response to receiving a second tokenization response message indicative of a refusal for the tokenization from the issuer, the server system facilitates transmission of the second tokenization response message to the token requester. Also, in a non-limiting implementation, the server system generates and transmits an alert to the cardholder of the payment card based, at least in part, on the second tokenization response message and the card credential information associated with the payment card.

As may be understood, upon tokenization of the payment card, the token can be used to perform upcoming transactions that can be referred to as tokenized transactions. Thus, it is to be noted that, in a non-limiting implementation, the server system can receive a tokenized transaction request indicative of a tokenized transaction initiated at a merchant by a user. Herein, the tokenized transaction request may include transaction information and the token. Further, the server system may map card credential information corresponding to the token in the database. The server system may facilitate the transmission of the mapped card credential information to the issuer for an approval of the tokenized transaction request. In response to receiving the approval from the issuer, the server system may authenticate the tokenized transaction. Further, the server system may generate and transmit a transaction approval message for the tokenized transaction request to the merchant. Alternatively, in response to receiving a refusal from the issuer, the server system may generate and transmit a transaction denial message to the merchant.

In some embodiments, the server system is configured to access tokenized transaction information associated with the payment card from the database. The tokenized transaction information may include information related to a plurality of tokenized transactions performed with a plurality of merchants. Each tokenized transaction may utilize a unique token linked to the identifier of the payment card for each merchant. Further, the server system may determine a fraudulent tokenized transaction set from the plurality of tokenized transactions performed using the payment card based, at least in part, on fraudulent behavior information associated with each of the plurality of tokenized transactions. Furthermore, the server system may generate and assign a pseudo label to each fraudulent tokenized transaction of the fraudulent tokenized transaction set based, at least in part, on the fraudulent behavior information and labeling criteria. The pseudo label may indicate that the fraudulency of the fraudulent tokenized transaction is due to an attempt-to-tokenization attack. Further, in a non-limiting implementation, the server system may be configured to update the cardholder-token feature set based, at least in part, on the pseudo label assigned to each fraudulent tokenized transaction.

Various embodiments of the present disclosure offer multiple advantages and technical effects. For instance, the present disclosure aims to solve the technical problem of provisioning tokens for payment cards of legitimate cardholders to illegitimate cardholders. It solves the problem in which fraudsters link stolen card credentials to their digital wallet or device and get a token generated for the stolen credentials. This token, when used to perform transactions by fraudsters, the transactions are instantly approved as excessive trust is placed in the digital wallets, especially for newly generated tokens. Consequently, all the players in the payment network experience huge financial losses. Thus, the proposed approach assigns a risk score to a tokenization request based on the historical behavior of the payment card and the token requester. By doing so, the issuers are provided with a metric, i.e., a risk score based on which they can either approve or decline the tokenization request. As a result, token provisioning fraud can be reduced significantly, saving resources, time, and cost which can be used for fraud detection of other kinds of frauds.

Further, the risk score makes it difficult for the fraudsters to tokenize the payment cards of the cardholders and make transactions in place of the cardholder, even if they get access to sensitive information of the cardholders. The usage of Artificial Intelligence (AI)/ML models for generating the risk score further cases the process and provides highly accurate results, as the ML models fine-tune with time and training. In addition, the vast variety of input feature sets used by the ML model facilitates improving the accuracy of the ML model to generate the risk score. Furthermore, the generation of pseudo labels for predicted fraudulent tokenized transactions based on the labeling criteria (as described later in the present disclosure) is also advantageous. The advantage is that these pseudo labels can be used as feedback for the ML model, fine-tuning the ML model to generate better results. Thus, it may be understood that the proposed approach provides an additional protection layer over tokenization to further improve the security of online transactions through a payment network.

Various example embodiments of the present disclosure are described hereinafter with reference to FIG. 1 to FIG. 9.

FIG. 1 illustrates a schematic representation of an environment 100 related to at least some example embodiments of the present disclosure. Although the environment 100 is presented in one arrangement, other embodiments may include the parts of the environment 100 (or other parts) arranged otherwise depending on, for example, receiving a tokenization request message, generating a risk score indicating a risk corresponding to a transaction associated with the tokenization request message, and the like.

The environment 100, generally includes a plurality of entities, such as a server system 102, a plurality of cardholders 104(1), 104(2), . . . 104(N) (collectively referred to hereinafter as a 'plurality of cardholders 104' or simply 'cardholders 104'), a plurality of merchants 106(1), 106(2), . . . 106(N) (collectively referred to hereinafter as a 'plurality of merchants 106' or simply 'merchants 106'), a plurality of issuer servers 108(1), 108(2), . . . 108(N) (collectively referred to hereinafter as a 'plurality of issuer servers 108' or simply 'issuer servers 108'), a plurality of acquirer servers 110(1), 110(2), . . . 110(N) (collectively referred to hereinafter as a 'plurality of acquirer servers 110' or simply 'acquirer servers 110'), a payment network 112 including a payment server 114, and a database 116 each coupled to, and in communication with (and/or with access to) a network 118. Herein, 'N' is a non-zero natural number, and the value of 'N' may or may not be the same for the plurality of entities shown in FIG. 1.

In one embodiment, the server system 102 is configured to facilitate the payment processors that control the payment network 112 to perform several operations required for determining the risk associated with the tokenization of payment cards. The details of these operations and various other configurations of the server system 102 are explained later in the present disclosure.

In an embodiment, the cardholder (e.g., the cardholder 104(1)) can be any individual, representative of a corporate entity, a non-profit organization, or any other person who is presenting payment account details during an electronic payment transaction. The cardholder (e.g., the cardholder 104(1)) may have a payment account issued by an issuing bank (not shown in figures) associated with an issuer server (e.g., the issuer server 108(1)).

In a non-limiting implementation, the cardholders 104(1)-104(N) may be provided with one or more payment cards 120(1), 120(2), . . . 120(N) (collectively, referred to hereinafter payment cards 120 and 'N' is a Natural number) respectively, to make the payment transactions with financial or other account information encoded onto the payment cards 120. The information may be encoded in the payment cards 120 such that the cardholders 104 can use the payment cards 120 to initiate and complete payment transactions using a bank account at the issuing bank.

In another non-limiting implementation, the cardholders 104 may use their corresponding electronic devices (not shown in figures) to access a mobile application or a website associated with the issuing bank, or any third-party payment application to perform a payment transaction. In various non-limiting examples, the electronic devices may refer to any electronic devices, such as but not limited to, Personal Computers (PCs), tablet devices, smart wearable devices, Personal Digital Assistants (PDAs), voice-activated assistants, Virtual Reality (VR) devices, smartphones, laptops, and the like.

In one embodiment, the cardholders 104 can be associated with the financial institutions such as issuing banks who are associated with the issuer servers 108. The terms "issuer bank", "issuing bank" or simply "issuer", "issuer server", and "issuer servers", hereinafter may be used interchangeably. It may be understood that a cardholder (e.g., the cardholder 104(1)) may have the payment account with the issuing bank, (that may issue a payment card 120(1), such as a credit card or a debit card to the cardholder 104(1)). Further, the issuing banks provide microfinance banking services (e.g., payment transactions using credit/debit cards) for processing electronic payment transactions, to the cardholder (e.g., the cardholder 104(1)).

In an embodiment, the merchants 106 can include retail shops, restaurants, supermarkets or establishments, government and/or private agencies, or any such places equipped with Point of Sale (POS) terminals, where the cardholders 104 visit to perform financial transactions in exchange for any goods and/or services or any financial transactions. In another embodiment, the cardholders 104 may perform the payment transactions with the merchants 106 through an online platform (i.e., a Card not present (CNP) transaction). In an embodiment, the merchants 106 are generally associated with financial institutions such as acquiring banks who are associated with the acquirer servers 110. The terms "acquirer", "acquirer bank", "acquiring bank", "acquirer server", and "acquirer servers" will be used interchangeably hereinafter. The acquiring bank can be an institution that facilitates the processing of payment transactions for physical stores, merchants, or institutions that own platforms that make either online purchases or purchases made via software applications possible.

In one scenario, the cardholders 104 may use their corresponding payment accounts to conduct payment transactions with the merchants 106. Moreover, it may be noted that each of the cardholders 104 may use their corresponding payment cards 120 differently or make the payment transaction using different modes of payment, such as net banking, Unified Payments Interface (UPI) payment, card transaction, cheque transaction, etc. For instance, the cardholder 104(1) may enter payment account details on an electronic device (not shown) associated with the cardholder 104(1) to perform an online payment transaction. In another instance, the cardholder 104(2) may utilize the payment card 120(2) to perform an offline payment transaction. In yet another instance, another cardholder may enter details of their payment card such as the payment card 120(1) to transfer funds in the form of a fiat currency on an e-commerce platform to buy goods.

Due to the complexity of the banking network, in some embodiments, the cardholder 104(1) and the merchant 106(1) can be associated with the same banking institution, e.g., ABC Bank. In such a situation, the ABC Bank will act as an issuer for the cardholder 104(1) and an acquirer for the merchant 106(1). Thus, a banking institution may act as both an acquirer and/or an issuer depending on the needs of its clients.

In one embodiment, the payment network 112 may be used by the payment card issuing authorities such as the issuers, as a payment interchange network. A payment interchange network allows for the exchange of electronic payment transaction data between the issuers and the acquirers. The payment network 112 includes the payment server 114 which is responsible for facilitating the various operations of the payment network 112. In one scenario, the payment server 114 is configured to operate a payment gateway for facilitating the various entities in the payment network 112 to perform digital transactions.

In various embodiments, the network 118 may include, without limitation, a Light Fidelity (Li-Fi) network, a Local Area Network (LAN), a Wide Area Network (WAN), a Metropolitan Area Network (MAN), a satellite network, the Internet, a fiber optic network, a coaxial cable network, an infrared (IR) network, a Radio Frequency (RF) network, a virtual network, and/or another suitable public and/or private network capable of supporting communication among two or more of the parts or users illustrated in FIG. 1, or any combination thereof.

Various entities in the environment 100 may connect to the network 118 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, New Radio (NR) communication protocol, any future communication protocol, or any combination thereof. In some instances, the network 118 may utilize a secure protocol (e.g., Hypertext Transfer Protocol (HTTP), Secure Socket Lock (SSL), and/or any other protocol, or set of protocols for communicating with the various entities depicted in FIG. 1.

As may be understood, entering the card credentials every time the cardholder 104(1) tries to perform a new payment transaction can be a tedious job, time-consuming, and unpleasant experience for the cardholder 104(1). To eliminate the re-entering of the card credentials, the merchants 106 adapted a feature of saving the payment card (e.g., the payment card 120(1)) on the online platform associated with the merchants 106. Saving the payment card 120(1) refers to saving the card credentials of the payment card 120(1) on the corresponding platform of the merchant 106(1). However, the risk of data breaches, merchant spoofing, and other financial frauds, the process of tokenization (as defined earlier in the present disclosure) is enforced by the government on the merchants 106 facilitating the cardholders 104 to protect misuse their payment cards 120 while saving them on their platforms. Thus, the payment cards 120 or the card credentials of the payment cards 120 may be stored on the platform of the merchants 106 in the form of a token (i.e., a randomly generated number). The merchant 106(1) may not have any access to any of the card credentials associated with the payment cards 120 of the cardholders 104. For future transactions, the cardholder 104(1) may use the token saved on the platform of the merchant 106(1), eliminating the need to re-enter the card credentials. It is noted that the term "token" refers to a number that does not have any meaning in itself, rather being merely a unique number linked to an identifier of a specific payment card or specific card credentials (such as a Personal Account Number (PAN)

of the payment card 120(1)). Moreover, the token is different for different merchants and is generated randomly for each merchant.

Further, upon generation of the token, the token may be provided to the cardholder 104(1) by transmitting the token to an electronic device, a digital wallet, a server, or the like corresponding to the cardholder 104(1). Thus, it may be understood that a different token can be generated for a different electronic device, a digital wallet, a server, or the like corresponding to the cardholder 104(1). However, during the process of token provisioning including the steps of generating and transmitting the token to the cardholder 104(1), the card credentials of the cardholder 104(1) can be compromised. For instance, an entity or the cardholder 104(1) requesting for the tokenization of the payment card 120(1) is a fraudulent entity or a fraudulent cardholder. More specifically, in some scenarios, fraudsters can get access to sensitive information of the cardholders 104 through scams, such as social engineering, phishing scams, dark websites, or the like. Then, the fraudsters can send a tokenization request from their device to a token requester, who further initiates the tokenization process through the payment network 112 and the issuer server 108(1). As a result, the token for the card credentials of a legitimate cardholder may be sent to the device of the fraudster. The fraudster within a short span of time can perform multiple transactions with a large amount, until the fraudulent act is detected, causing a huge loss to the cardholder 104(1).

Therefore, the above-mentioned technical problems, among other problems, are addressed by one or more embodiments implemented by the server system 102 and the methods thereof provided in the present disclosure. It should be noted that the server system 102 is targeted to determine the risk associated with the tokenization of the payment cards 120. As a result, the server system 102 assists the issuers in deciding whether to approve or decline a tokenization request. The server system 102 also targets fine-tuning a tokenization fraud dataset by generating and assigning pseudo labels to transactions that are detected to be fraudulent within a few days of the provision of tokens for the corresponding transactions. The pseudo labels indicate the tokenized transaction being an attempt-to-tokenization attack.

In a specific embodiment, the server system 102 may be used by the payment processors by embedding the server system 102 in the payment server 114. Further, since the cardholders 104, the merchants 106, and/or the financial institutions such as the issuers and/or the acquirers face major losses due to the above-mentioned frauds, the payment processors may provide their services to them. For instance, the issuers may subscribe to the payment processors by providing their credentials. Later, when a tokenization request message is received, the issuer or the issuer server (e.g., the issuer server 108(1)) may also receive a risk score associated with the tokenization request message. This risk score may assist the issuer to decide on whether to approve or reject the tokenization request message.

In one scenario, the cardholder 104(1) may generate the tokenization request message through a platform facilitated by the merchant (e.g., the merchant 106(1)). In another scenario, the cardholder 104(1) may generate the tokenization request message through a token requester as depicted in the environment 100. More specifically, in one embodiment, the environment 100 depicts a plurality of token requesters 122(1), 122(2), . . . 122(N) (collectively referred to hereinafter as a 'plurality of token requesters 122' or simply 'token requesters 122'). Herein, 'N' is a non-zero natural number, and the value of 'N' may or may not be the same for the plurality of entities shown in FIG. 1. In various examples, the token requesters 122 can be any individual, such as a merchant, a cardholder, a third-party, or the like. In various other examples, the token requesters 122 can be a third-party platform capable of transmitting the tokenization request messages upon receiving the request from the cardholder 104(1) at the platform of the merchant 106(1). For example, when the cardholder 104(1) visits the platform of the merchant 106(1) to perform a payment transaction, the platform may provide a feature of tokenization of the payment cards (e.g., the payment cards 120) of the cardholder 104(1) facilitated by the third-party platform. The cardholder 104(1) can subscribe for such a feature. Upon subscription, the cardholder 104(1) can initiate the tokenization request message at the platform of the merchant 106(1) which is transmitted to the payment network 112 through the token requester 122(1). In a non-limiting implementation, the payment network 112 is associated with the server system 102.

In a specific embodiment, the server system 102 is configured to receive the tokenization request message requesting for a tokenization of a payment card (e.g., the payment card 120(1)) of a cardholder (e.g., the cardholder 104(1)) for a particular merchant (e.g., the merchant 106(1)). The tokenization request message may be received from a token requester (e.g., the token requester 122(1)). The tokenization request message can include card credential information, such as, but not limited to, a PAN, a card number, a Card Verification Value (CVV), the expiry date of the payment card (e.g., the payment card 120(1)), and the like.

In a specific scenario, the server system 102 may have to forward the tokenization request message to the issuer for approval, as the issuer is responsible for the authorization of the cardholder 104(1) for every transaction. Before forwarding the tokenization request message, the server system 102 may have to analyze the risk corresponding to the transaction associated with the tokenization request message. Thus, in one embodiment, the server system 102 is configured to access a cardholder-token feature set corresponding to the cardholder 104(1) from the database 116 associated with the server system 102. Further, the server system 102 may also access a token requester feature set corresponding to the token requester 122(1) from the database 116. It is to be noted that the server system 102 may access these feature sets from the database 116 based, at least in part, on the card credential information.

In one embodiment, the database 116 may be incorporated in the server system 102 or maybe an individual entity connected to the server system 102 or maybe a database stored in cloud storage. In various non-limiting examples, the database 116 may include one or more Hard Disk Drives (HDD), Solid-State Drives (SSD), an Advanced Technology Attachment (ATA) adapter, a Serial ATA (SATA) adapter, a Small Computer System Interface (SCSI) adapter, a Redundant Array of Independent Disks (RAID) controller, a Storage Area Network (SAN) adapter, a network adapter, and/or any component providing the server system 102 with access to the database 116. In one implementation, the database 116 may be viewed, accessed, amended, updated, and/or deleted by an administrator (not shown) associated with the server system 102 through a Database Management System (DBMS) or Relational Database Management System (RDBMS) present within the database 116.

In another embodiment, the server system 102 is configured to generate a risk score indicating a risk corresponding to the transaction associated with the tokenization request message. In one non-limiting implementation, the risk score may be generated based, at least in part, on the cardholder-token feature set, the token requester feature set, and scoring criteria. In another implementation, the risk score may be generated, based at least on a merchant feature set, a token feature set, and the like. More specifically, the server system 102 may generate the risk score using an ML model 124 associated with the server system 102. Further, the process of generating the risk score and the process of the tokenization of the payment card 120(1) of the cardholder 104(1) is explained later in the present disclosure.

In a non-limiting example, it is noted that the database 116 is configured to store information, such as, but not limited to the card credential information, a historical cardholder dataset, a historical token requester dataset, a historical merchant dataset, the cardholder-token feature set, the token requester feature set, the merchant feature set, the token feature set, the scoring criteria, the ML model 124, and the like. Upon generation of the risk score, it may also be stored in the database 116.

In various examples, the database 116 may also store multifarious data, for example, social media data, Know Your Customer (KYC) data, payment data, trade data, employee data, Anti Money Laundering (AML) data, market abuse data, Foreign Account Tax Compliance Act (FATCA) data, and fraudulent payment transaction data. In addition, the database 116 provides a storage location for data and/or metadata obtained from various operations performed by the server system 102.

It should be understood that the server system 102 is a separate part of the environment 100 and may operate apart from (but still in communication with, for example, via the network 118) any third-party external servers (to access data such as the training datasets to perform the various operations described herein). However, in other embodiments, the server system 102 may be incorporated, in whole or in part, into one or more parts of the environment 100.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices are shown in FIG. 1 may be implemented within a single system or device, or a single system or device is shown in FIG. 1 may be implemented as multiple, distributed systems or devices. In addition, the server system 102 should be understood to be embodied in at least one computing device in communication with the network 118, which may be specifically configured, via executable instructions, to perform steps as described herein, and/or embodied in at least one non-transitory computer-readable media.

Figure 2:
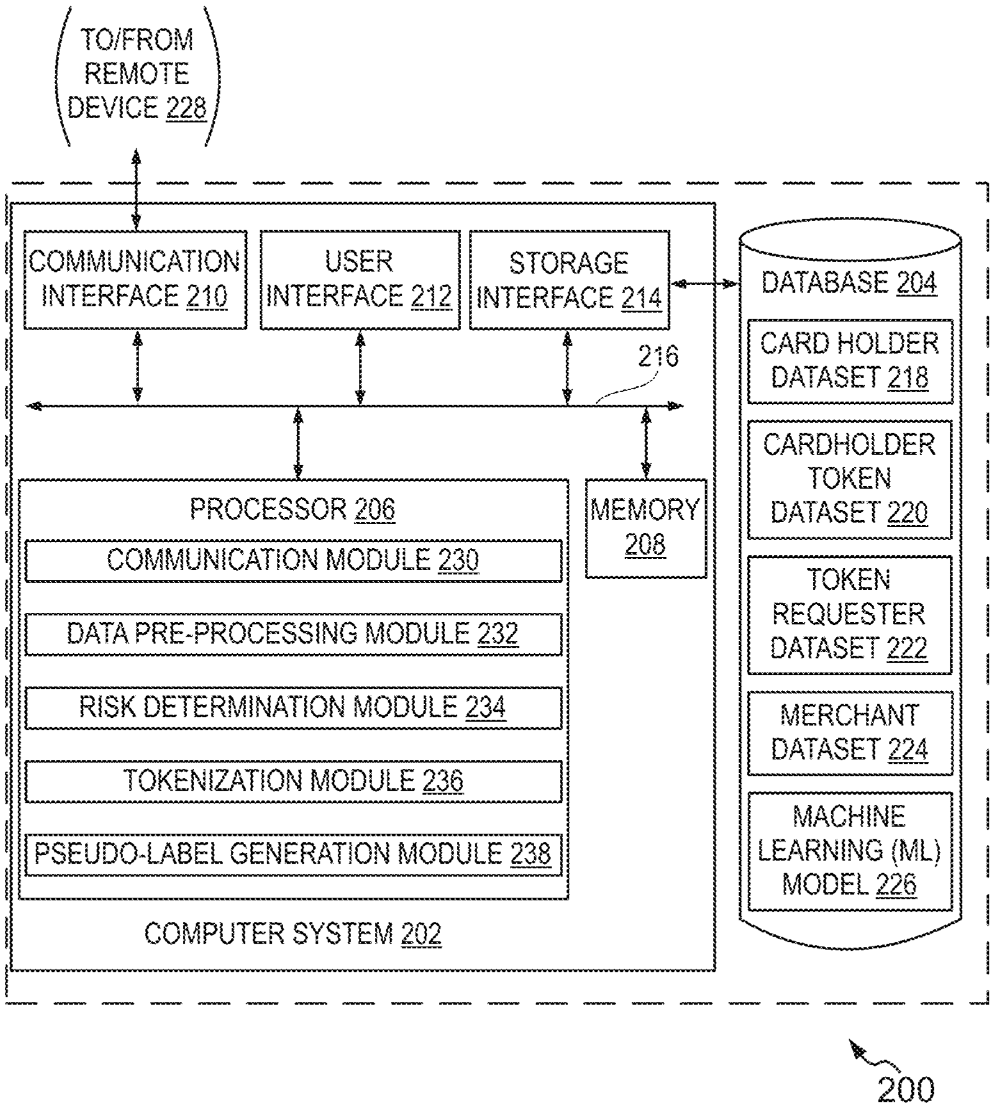
FIG. 2 illustrates a simplified block diagram of a server system, in accordance with an embodiment of the present disclosure.

FIG. 2 illustrates a simplified block diagram of a server system 200, in accordance with an embodiment of the present disclosure. The server system 200 is identical to the server system 102 of FIG. 1. In some embodiments, the server system 200 is embodied as a cloud-based and/or software as a service (Saas) based architecture. In a non-limiting implementation, the server system 200 is a payment server (e.g., the payment server 114) associated with a payment network (e.g., the payment network 112).

The server system 200 includes a computer system 202 and a database 204. The computer system 202 includes at least one processor 206 (herein, referred to interchangeably as 'processor 206') for executing instructions, a memory 208, a communication interface 210, a user interface 212, and a storage interface 214. One or more components of the computer system 202 communicate with each other via a bus 216. The components of the server system 200 provided herein may not be exhaustive and the server system 200 may include more or fewer components than those depicted in FIG. 2. Further, two or more components depicted in FIG. 2 may be embodied in one single component, and/or one component may be configured using multiple sub-components to achieve the desired functionalities.

In some embodiments, the database 204 is integrated into the computer system 202. In one embodiment, the database 204 is substantially similar to the database 116 of FIG. 1. In one non-limiting example, the database 204 is configured to store an input dataset, such as a cardholder dataset 218, a cardholder token dataset 220, a token requester dataset 222, a merchant dataset 224, a ML model 226, and the like. Herein, the ML model 226 is similar to the ML model 124 described in FIG. 1.

In a non-limiting implementation, the cardholder dataset 218 may include historical information related to a plurality of payment transactions performed by the cardholders 104 with the merchants 106. In a specific embodiment, the payment transactions are performed using the payment cards 120. In various examples, the historical information includes, but is not limited to, transaction attributes, such as transaction amount, source of funds, such as bank accounts, debit cards or credit cards, transaction channel used for loading funds, such as Point of Sale (POS) terminal or Automated Teller Machine (ATM), transaction velocity features, such as count and transaction amount sent in the past 'x' number of days to a particular user, transaction location information, external data sources, cardholder Identifier (ID), cardholder product, cardholder PAN, merchant country, merchant ID, Merchant Category Code (MCC), merchant location data or merchant co-ordinates, merchant industry, merchant super industry, ticket price, etc., among other transaction-related attributes.

In another non-limiting example, the cardholder token dataset 220 includes but is not limited to, information related to a plurality of tokens the cardholder 104(1) may have been generated for their payment cards 120 at different merchants 106 in the past. In various non-limiting examples, the information includes past token (otherwise also referred to as Device PAN (DPAN)) statuses, such as a number of de-activated tokens, a number of suspended tokens, a number of active tokens, a number of times a particular token was de-activated, suspended, or re-activated for a particular merchant and a particular device, digital wallet, or server corresponding to the particular cardholder, and the like. It is noted that the cardholder dataset 218 and the cardholder token dataset 220 are examples of the historical cardholder dataset described in FIG. 1.

In yet another non-limiting implementation, the token requester dataset 222 includes but is not limited to, historical information related to the token requesters 122. In various non-limiting examples, the historical information may include a token requester ID, a number of payment cards of the payment cards 120 tokenized at the corresponding token requester (e.g., the token requester 122(1)), a number of cardholders of the cardholders 104 tokenized at the token requester 122(1), a type of the token requester 122(1), such as a card on file, a digital wallet, an issuer application, e-commerce, or the like, fraudulent activities recorded at the token requester 122(1), and the like. It may also be noted that the token requester dataset 222 is an example of the historical token requester dataset as described in FIG. 1.

Further, in another non-limiting implementation, the merchant dataset 224 includes, but is not limited to, merchant country, merchant ID, MCC, merchant location data or merchant co-ordinates, merchant industry, merchant super industry, details (as described above) related to different cardholders of the cardholders 104 that transacted at a particular merchant such as the merchant 106(1), the type of token requester 122(1) featured by the merchant 106(1), details (as described above) related to the token requesters of the token requesters 122 registered at the merchant 106(1), fraudulent activities at the merchant 106(1), and the like. Further, the merchant dataset 224 is also an example of the historical merchant dataset described in FIG. 1.

Further, the computer system 202 may include one or more hard disk drives as the database 204. The user interface 212 is an interface, such as a Human Machine Interface (HMI) or a software application that allows users 104 such as an administrator to interact with and control the server system 200 or one or more parameters associated with the server system 200. It may be noted that the user interface 212 may be composed of several components that vary based on the complexity and purpose of the application. Examples of components of the user interface 212 may include visual elements, controls, navigation, feedback and alerts, user input and interaction, responsive design, user assistance and help, accessibility features, and the like. More specifically these components may correspond to icons, layout, color schemes, buttons, sliders, dropdown menus, tabs, links, error/success messages, mouse and touch interactions, keyboard shortcuts, tooltips, screen readers, and the like.

The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute operations for receiving the tokenization request message, accessing a feature set corresponding to the cardholder 104(1) and the token requester 122(1), generating the risk score for the transaction associated with the tokenization request message, and the like. Examples of the processor 206 include, but are not limited to, an Application-Specific Integrated Circuit (ASIC) processor, a Reduced Instruction Set Computing (RISC) processor, a Graphical Processing Unit (GPU), a Complex Instruction Set Computing (CISC) processor, a Field-Programmable Gate Array (FPGA), and the like.

The memory 208 includes suitable logic, circuitry, and/or interfaces to store a set of computer-readable instructions for performing operations. Examples of the memory 208 include a Random-Access Memory (RAM), a Read-Only Memory (ROM), a removable storage drive, a Hard Disk Drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210, such that the processor 206 is capable of communicating with a remote device 228, such as electronic devices of the users 104, or communicating with any entity connected to the network 118 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one implementation, the processor 206 includes a communication module 230, a data pre-processing module 232, a risk determination module 234, a tokenization module 236, and a pseudo-label generation module 238. It should be noted that components, described herein, such as the communication module 230, the data pre-processing module 232, the risk determination module 234, the tokenization module 236, and the pseudo-label generation module 238 can be configured in a variety of ways, including electronic circuitries, digital arithmetic, and logic blocks, and memory systems in combination with software, firmware, and embedded technologies. Moreover, it may be noted that the communication module 230, the data pre-processing module 232, the risk determination module 234, the tokenization module 236, and the pseudo-label generation module 238 may be communicably coupled with each other to exchange information with each other for performing the one or more operations facilitated by the server system 200.

In one embodiment, the communication module 230 includes suitable logic and/or interfaces for receiving the tokenization request message requesting for a tokenization of a payment card (e.g., the payment card 120(1)) of a cardholder (e.g., the cardholder 104(1)) for a particular merchant (e.g., the merchant 106(1)). The tokenization request message may be received from a token requester (e.g., the token requester 122(1)). As described earlier, the tokenization request message may also include the card credential information related to the payment card 120(1) that is to be tokenized. As may be understood, when the cardholder 104(1) subscribes to the feature of tokenization at a platform of the merchant 106(1), tokenization of any payment card of the payment cards 120 of the cardholder 104(1) can be requested at the corresponding platform. During this processing of tokenization, the merchant 106(1) may request the cardholder 104(1) to provide the details required to initiate the tokenization process, such as the card credential information. Further, the merchant 106(1) may not save these details at the platform or a server related to the merchant 106(1), but rather transmit them to the server system 200 through the token requester 122(1). In some embodiments, the token requester 122(1) can include the merchant 106(1). During this process, there is a possibility that the tokenization feature on the platform of the merchant 106(1) is not initiated by the cardholder 104(1), rather it is initiated by a fraudster impersonating the cardholder 104(1). However, the merchant 106(1), the cardholder 104(1), and the issuer are unaware of the initiation of this activity. Therefore, this process may continue without any disturbance. As a result, along with these details, the merchant 106(1) may also transmit other details, such as, but not limited to, some information from the cardholder dataset 218, the cardholder token dataset 220, the token requester dataset 222, the merchant dataset 224, and the like corresponding to the cardholder 104(1). In various examples, the other details may include the processing code of the PAN, a transaction amount, a POS terminal PAN entry mode, a POS terminal PIN entry mode, a response code, a card acceptor name and/or location, a transaction category type, a device type, a wallet ID, Address Verification Service (AVS) details, an AVS response, a card validation code result, and the like.

As a result, in a non-limiting implementation, as the tokenization request message is received, the communication module 230 is configured to receive the above-mentioned details as well and store them in the database 204 for future use. In some embodiments, the server system 200 may have similar information related to different cardholders 104, different merchants 106, different token requesters 122, and the like. The received details, historical details, pre-stored details and other details obtained using any other modes may be stored in the database 204 as a part of the cardholder dataset 218, the cardholder token dataset 220, the token requester dataset 222, the merchant dataset 224, and the like.

In one embodiment, the data pre-processing module 232 includes suitable logic and/or interfaces for accessing the input dataset including the cardholder dataset 218, the cardholder token dataset 220, the token requester dataset 222, the merchant dataset 224, and the like corresponding to the cardholder 104(1) from the database 204. The data pre-processing module 232 may access the input dataset from the database 204 based on the card credential information associated with the tokenization request message. Further, the data pre-processing module 232 may pre-process or prepare the input dataset for training the ML model 226. In a non-limiting example, the ML model 226 can be a supervised ML model. In another non-limiting example, the ML model 226 can be an unsupervised ML model, a semi-supervised ML model, or the like, without limiting the scope of the approach proposed in the present disclosure. Various examples for the ML model 226 include but are not limited to, an Extreme Gradient Boosting (XGBoost) model, a Neural Network (NN)-based model, a linear regression model, a logistic regression model, Support Vector Machine (SVM) model, clustering, and the like.

The ML model 226 may be trained to generate the risk score indicating the risk corresponding to a transaction associated with the tokenization request message. Herein, the generation of the risk score helps in determining whether the tokenization request message was generated by the authorized cardholder (i.e., the cardholder 104(1)) or the fraudster impersonating the cardholder 104(1).

As may be understood, the term 'dataset' refers to raw input data that may be used during different stages, such as training, testing, validating, or during deployment of any AI or ML model. However, prior to using the dataset, it is prepared or made suitable for any of the above-mentioned stages by featurization or performing a feature generation operation on the dataset. Generally, the dataset includes multiple data points or data samples. As used herein, the terms 'data point' and 'data sample', may be used interchangeably, and refer to a single instance or observation within the dataset.

In some embodiments, each data sample may represent a single user or individual. In some other embodiments, based on the nature of the dataset and the problem being addressed, a data sample may represent aggregated or summarized information about multiple users of individuals. However, it is to be noted that each data point or data sample represents a unique combination of features or attributes that describe some aspect of the objective of training the model. During featurization, in one embodiment, these features may be extracted from the dataset for each data sample. In another embodiment, new features may be generated for each data sample using the various data fields associated with each user in the raw data. Some of the features required for processing the tokenization request message may be pre-stored in the database 204. These features may also be extracted from the database 204. Thus, the extracted features and the newly generated features may correspond to insights, useful information, relevant patterns, and the like associated with the accessed dataset.

Thus, it may be understood that a cardholder-token feature set may be obtained upon preprocessing the cardholder dataset 218 and the cardholder token dataset 220. Further, a merchant feature set may be obtained upon preprocessing the merchant dataset 224. Similarly, a token requester feature set may be obtained upon preprocessing the token requester dataset 222. The input dataset is preprocessed for obtaining feature sets for improving the model's performance and stored back in the database 204. In a non-limiting example, preprocessing may include performing several operations on the dataset to make the dataset suitable for any stage of the model. For instance, the operations may include removing noise, feature engineering (also referred to as featurization or feature generation), feature selection, data cleaning, handling missing values, normalizing or scaling data, analyzing characteristics of the data, and converting the dataset into a format that AI or ML models can process. Since these operations are well known in the art, the same has not been described herein for the sake of brevity.

As may be understood, the cardholder-token feature set may include a cardholder behavior feature set, a historical token-related feature set, and the like. In various examples, the cardholder behavior feature set includes but is not limited to, an average transaction amount, a spending pattern through different payment cards, a spending pattern through different tokens, a number of tokens re-digitized, a number of tokens generated for each payment card of the cardholder 104(1), and the like. It is noted that the cardholder behavior feature set may provide insights about the spending pattern of the cardholder 104(1) across different payment cards of the payment cards 120 and the tokens. For instance, if the historical spending pattern and the current patterns do not match, then the token may be suspicious. Similarly, the historical token-related feature set may provide insights into new token generation by the cardholder 104(1). For instance, for a cardholder not having any history of saving their payment cards at multiple merchants at tokens, if suddenly a token is generated, then that may be a fraudulent activity. Also, in some scenarios, for a cardholder with a very low number of tokens which suggests inactivity, sudden token requests on such payment cards can be suspicious.

Further, the merchant feature set may include account compromise information, merchant fraud monitoring information, high-risk channel information, chargeback risk information, card behavioral pattern information, various scores related to risks, fraud, spending patterns, etc., an average transaction amount, a number of tokenization requests, and the like. Furthermore, the token requester feature set may include token requester ranks based on past fraudulent tokens, a number of fraudulent tokens determined in the past, an average number of tokens compromised for each tokenization request message, and the like. The merchant feature set and the token requester feature set may provide insights into third-party suspicious behavior. For instance, if a cardholder (e.g., the cardholder 104(1)) gets a token generated with a token requester (e.g., the token requester 122(1)) or a merchant (e.g., the merchant 106(1)) has a high fraud rate reported on tokens in the past, then the credentials of the cardholder 104(1) may be at risk. The feature sets may be transmitted to the risk determination module 234 for further processing.

In one embodiment, the risk determination module 234 includes suitable logic and/or interfaces for generating the risk score indicating a risk corresponding to a transaction associated with the tokenization request message based, at least in part, on the cardholder-token feature set, the token requester feature set, and scoring criteria. In a non-limiting implementation, the risk determination module 234 may generate the risk score using the ML model 226. For using the ML model 226, the ML model 226 may have to be trained on a training dataset. Thus, in another embodiment, the risk determination module 234 may train the ML model 226 to generate the risk score for determining the risk corresponding to a transaction associated with the tokenization request message.

For training the ML model 226, relevant feature sets corresponding to the particular cardholder 104(1) may have to be accessed from the database 204. Thus, in one embodiment, the risk determination module 234 accesses the cardholder-token feature set corresponding to the cardholder 104(1) and the token requester feature set corresponding to the token requester 122(1) from the database 204 based, at least in part, on the card credential information. In one embodiment, the cardholder feature set and the merchant feature set may also be accessed. These feature sets together may be considered as an input feature set. The input feature set may be split into a training feature set, a testing feature set, and a validation feature set based on different timelines associated with the accessed feature sets. The training feature set, the testing feature set, and the validation feature set may be utilized during a training phase, a testing phase, and a validation phase of the ML model 226. Further, during the deployment of the ML model 226, a real-time dataset may be used to generate the risk score for the tokenization request message. It is noted that the input dataset is updated with time, and hence the risk score also varies based on the updated input dataset (i.e., the real-time dataset) used for generating the risk score.

Upon accessing the input feature set, in some embodiments, more informative representations may be obtained from the features by generating embeddings. However, the generation of the embeddings is based on the type of data used or specific requirements of the model (i.e., the ML model 226). In some other embodiments, the features may be directly provided to the ML model 226.

In other words, for generating the risk score, the risk determination module 234 can access the training feature set for each transaction from the database 204 based, at least in part, on the cardholder-token feature set and the token requester feature set for each transaction. Further, for training the ML model 226, the risk determination module 234 can iteratively perform a set of operations until convergence criteria are met. In a non-limiting implementation, the set of operations may include: (i) initializing the ML model 226 based, at least in part, on one or more model parameters; (ii) generating, by the ML model 226, a predicted probability score for each transaction based, at least in part, on the training feature set and the one or more model parameters, the predicted probability score indicating a likelihood of the transaction being risky; (iii) computing, by the ML model 226, a loss for each transaction based, at least in part, on the predicted probability score, true labels, and a loss function; and (iv) optimizing the one or more model parameters based, at least in part, on back-propagation of the loss.

In an embodiment, the one or more model parameters may be initialized based at least on the type of the model chosen for the ML model 226. In general, the one or more model parameters may include, but not be limited to, coefficients or weights associated with each feature, bias terms, regularization parameters, and the like. In another embodiment, the one or more model parameters may also include hyperparameters, such as leaning rate, epochs, kernel depth for SVM-based models, depth of trees for decision tree-based models, a number of layers, a number of neurons in a hidden layer of NN-based models, batch size, and the like.

Upon initializing the one or more model parameters, the ML model 226 may be initialized based on the model parameters. The risk determination module 234 may then generate the predicted probability score for each transaction. During the training phase of the ML model 226, upon computing the predicted probability score, the loss for each transaction is computed using the loss function and the true labels. If the ML model 226 is the XGBoost model, then the loss function can be a Binary Cross-Entropy (BCE) loss (otherwise also referred to as logarithmic loss of logloss). In a non-limiting example, this loss function is represented as follows:

$$\text{Logloss} = -\frac{1}{N}\sum_{i=1}^{N}\left[y_i\log(p_i) + (1-y_i)\log(1-p_i)\right] \quad \text{Eqn. (1)}$$

Herein, $y_i$ is the true label (1 for risky, 0 for not risky), $p_i$ is the predicted probability score from the ML model 226, and N is the total number of samples (i.e., the transactions).

In various other examples, the loss function can be any other loss function, such as mean squared error loss function, cross-entropy loss function, or the like, without limiting the scope of the approach proposed in the present disclosure. Later, based on the loss computed, the model parameters may be optimized, such that during the next iteration, the loss reduces. Upon optimization of the model parameters, the ML model 226 may generate a new predicted probability score for each transaction and the process repeats. This process is repeated until the convergence criteria are met. Herein, the convergence criteria may include saturation of the loss. In an embodiment, the loss may saturate after a plurality of iterations of the set of operations is performed. Herein, saturation may refer to a stage in the model training process after a certain number of iterations where a loss value (e.g., the loss) becomes constant, i.e., the difference in the loss for one iteration and its subsequent iteration becomes the same or negligible. The loss of any model is associated with model performance, so, the less the loss the better the model performance.

Once the convergence criteria are met, the ML model 226 may be able to generate the predicted probability score that is highly accurate, thereby generating a highly accurate prediction about the risk score of the transaction associated with the tokenization request message. Further, the ML model 226 may be tested and validated using the testing feature set and the validation feature set, respectively. In addition, the risk determination module 234 may be configured to generate the predicted probability score based, at least in part, on the cardholder-token feature set and the token requester feature set. Herein, the predicted probability score is indicative of a likelihood of the transaction associated with the tokenization request message being risky. The predicted probability score may be generated using the ML model 226. The risk determination module 234 may generate the risk score for the transaction associated with the tokenization request message based, at least in part, on the predicted probability score and the scoring criteria. As may be understood, the predicted probability score can be a value between 0 and 1. In a non-limiting implementation, according to the scoring criteria, the values between 0 and 1 are bucketed into at least five buckets with a threshold set for each bucket. The threshold set can include a minimum threshold value and a maximum threshold value which is distinct for each bucket. The risk score can be a value (i.e., a Natural number) between 0 to 4, with each value indicating each of the at least five buckets. For instance, if the predicted probability score is between 0 to 0.2, then the risk score may be 0. Similarly, for the predicted probability score between 0.2 to 0.4, 0.4 to 0.6, 0.6 to 0.8, and 0.8 to 1, the risk score can be 1, 2, 3, and 4, respectively. In some scenarios, when the predicted probability score ranges from 1 to 1000, then these values may be bucketed accordingly to generate the risk score. The risk score may be stored in the database 204 in correspondence to the card credential information. The risk score may also be transmitted to the tokenization module 236 for further processing.

In one embodiment, the tokenization module 236 includes suitable logic and/or interfaces for accessing the risk score for the transaction associated with the tokenization request message from the database 204. In another embodiment, the tokenization module 236 may be configured to facilitate transmission of the tokenization request message including the risk score to an issuer associated with the payment card for an approval for the tokenization of the payment card. In a specific scenario, in response to receiving the tokenization request message including the risk score, the issuer server 108(1) associated with the issuer may process it. The processing of the tokenization request message may facilitate the issuer to either approve or decline the request for the tokenization in the tokenization request message. This process is explained later in the present disclosure.

Further, in one embodiment, the tokenization module 236 receives a first tokenization response message from the issuer. Herein, the first tokenization response message is indicative of the approval for the tokenization from the issuer. Upon receiving the first tokenization response message, the tokenization module 236 may be configured to generate a token for the payment card 120(1). As may be understood, the token is a randomly generated unique number that is meaningless when not used through the payment server 114. Also, the token is generated for the payment card 120(1) which is used to make payment at a particular merchant such as the merchant 106(1). Thus, the token is specific to the merchant 106(1) and cannot be used to perform transactions at any other merchants of the merchants 106.

The tokenization module 236 may further be configured to extract the card credential information from the tokenization request message. Then, the tokenization module 236 may link an identifier of the payment card 120(1) with the corresponding token, based at least on the card credential information, and store it in the database 204. In a non-limiting example, the identifier of the payment card 120(1) can be the PAN of the payment card 120(1). In addition, the tokenization module 236 may facilitate transmission of the token linked with an identifier of the payment card 120(1) to the token requester 122(1). It is to be noted that only the token is transmitted to the token requester 122(1) and not the card credential information. The card credential information is securely stored in the database 204 of the server system 200. In a non-limiting implementation, if the tokenization request message was initiated by a cardholder such as the cardholder 104(1) through the token requester 122(1), then the token requester 122(1) may further facilitate transmission of the received token to an electronic device, a digital wallet, or a server associated with the cardholder 104(1). Thus, it may be understood that the token is device-specific or wallet-specific. In other words, if the cardholder 104(1) tries to use the token to perform future transactions using another electronic device or another digital wallet, then the token is detected to be invalid. Also, if the cardholder 104(1) utilizes the token to perform a payment transaction at another merchant instead of the merchant 106(1), then the token is detected to be invalid. The process of using the token for performing a payment transaction is explained later in the present disclosure.

In another embodiment, the tokenization module 236 receives a second tokenization response message from the issuer. Herein, the second tokenization response message is indicative of a refusal of the tokenization from the issuer. In response to receiving the second tokenization response message, the tokenization module 236 may be configured to transmit the second tokenization response message to the token requester 122(1). The token requester 122(1) may further facilitate transmission of the second tokenization response message to the device, the digital wallet, or the server associated with the cardholder 104(1) if the cardholder 104(1) had initiated the tokenization request message. This may happen in scenarios where the issuer may have wrongly generated the second tokenization response message for the tokenization request message due to an error in the generation of the risk score which may rarely happen. Alternatively, in one embodiment, the tokenization module 236 generates and transmits an alert to the cardholder 104(1) of the payment card 120(1) based, at least in part, on the second tokenization response message and the card credential information associated with the payment card 120(1). Herein, the alert is generated to notify the cardholder 104(1) about the attempt-to-tokenization attack. This happens in a scenario where the card credentials of the cardholder 104(1) are stolen by a fraudster. Then, the fraudster initiated the tokenization request message from their device. Moreover, the server system 200 has correctly detected the tokenization request message to be fraudulent and hence has generated the second tokenization response message. Upon detection of such a fraudulent activity, the authorized cardholder, i.e., the cardholder 104(1) can be notified about such an activity. As the card credential information of the payment card 120(1) is available with the server system 200, the tokenization module 236 may generate and transmit the alert to the cardholder 104(1) on an electronic device of the cardholder 104(1).

As may be understood, several payment cards of the payment cards 120 belonging to different cardholders of the cardholders 104 can be tokenized. Further, the cardholders 104 may perform several tokenized transactions using the token generated for each payment card. The server system 200 is also configured to keep track of the tokenized transactions being performed using the pseudo-label generation module 238. Thus, it may be understood that tokenized transaction information associated with several payment cards 120 that perform payment transactions through the payment network 112 is stored in the database 204 which is accessible for future use.

After tokenization of the payment cards 120, the cardholders 104 may experience fraud. This fraud may be either due to a token provisioning attack or other kinds of fraud. To determine the possibility of the fraud being due to the token provisioning attack, one or more conditions may be set. Further, based on the one or more conditions, pseudo-labels may be generated and assigned to fraudulent tokenized transactions. Herein, the pseudo label may indicate a label assigned to the fraudulent tokenized transaction whose fraudulency is due to the token provisioning attack.

Thus, in one embodiment, the pseudo-label generation module 238 includes suitable logic and/or interfaces for accessing the tokenized transaction information (not shown in FIG. 2) associated with the payment card (e.g., the payment card 120(1)) from the database 204. The tokenized transaction information may include information related to a plurality of tokenized transactions performed with the plurality of merchants 106. Herein, each tokenized transaction may utilize a unique token linked to the identifier of the payment card 120(1) for each merchant.

In various examples, the information related to the tokenized transactions can include a token used by the payment card for performing a particular tokenized transaction, card credentials linked to the token, a merchant ID where the transaction is performed, a transaction amount, a count of the tokenized transactions performed at different merchants, a number of tokens linked to the identifier of the payment card, and the like.

In another embodiment, the pseudo-label generation module 238 may determine a fraudulent tokenized transaction set from the plurality of tokenized transactions based, at least in part, on fraudulent behavior information associated with each of the plurality of tokenized transactions. In a non-limiting implementation, the fraudulent behavior information for a particular tokenized transaction can include a fraud label being associated with the corresponding transaction, detection of an unusual transaction of some large amount, detection of an unusual number of transactions, and the like. For instance, if a fraudulent transaction is detected on the same day of the tokenization of the payment card (e.g., the payment card 120(1)), then the fraudulency of that fraudulent transaction is mostly likely due to a token provisioning fraud. Similarly, if fraud is observed within seven to ten of the token creation for the payment card 120(1), then the fraudulency of that fraudulent transaction is mostly likely due to the token provisioning fraud. These instances can be the one or more conditions that can be considered for pseudo-labeling the fraudulent tokenized transactions. The pseudo-label generation module 238 may detect such fraudulent tokenized transactions. Later, in one embodiment, the pseudo-label generation module 238 may generate and assign a pseudo label to each fraudulent tokenized transaction of the fraudulent tokenized transaction set based, at least in part, on the fraudulent behavior information and labeling criteria. Herein, the pseudo label may indicate that the fraudulency of the fraudulent tokenized transaction is due to an attempt-to-tokenization attack. The terms "attempt-to-tokenization", "tokenization attack", "token provisioning attack", "token provisioning fraud", or "tokenization fraud" have been used interchangeably herein, and refer to an attack or a fraud that is related to the token provisioning, tokenization, or digitization of the payment card 120(1).

Further, the labeling criteria may indicate the one or more conditions (explained earlier in the present disclosure) based on which the fraudulent tokenized transaction is labeled with a pseudo label. For example, if a fraudulent transaction through the payment card 120(1) was detected within seven days of the tokenization of the payment card 120(1), then that corresponding fraudulent transaction (which is a fraudulent tokenized transaction) will be assigned with the pseudo label. In some embodiments, the pseudo-label generation module 238 is configured to update the cardholder-token feature set based, at least in part, on the pseudo label assigned to each fraudulent tokenized transaction. As a result, the risk score that may be generated based on the updated cardholder-token feature set may be more accurate compared to the older value of the risk score.

Figure 3:
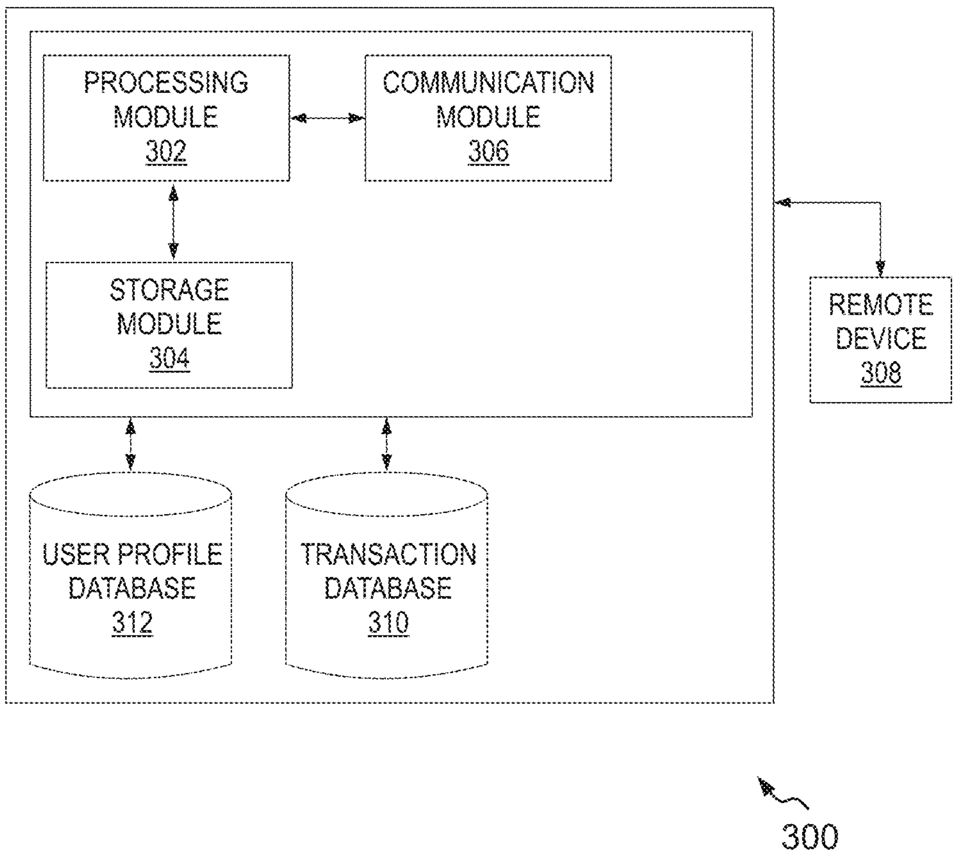
FIG. 3 illustrates a simplified block diagram of an issuer server, in accordance with an embodiment of the present disclosure.

FIG. 3 illustrates a simplified block diagram of an issuer server 300, in accordance with an embodiment of the present disclosure. The issuer server 300 is an example of the issuer server (e.g., the issuer server 108(1)) of FIG. 1. The issuer server 300 is associated with an issuer bank/issuer, in which an account holder (e.g., the cardholder 104(1)) may have an account, which provides a payment card (e.g., the payment card 120(1)). The issuer server 300 includes a processing module 302 operatively coupled to a storage module 304 and a communication module 306. The components of the issuer server 300 provided herein may not be exhaustive, and the issuer server 300 may include more or fewer components than those depicted in FIG. 3. Further, two or more components may be embodied in one single component, and/or one component may be configured using multiple sub-components to achieve the desired functionalities. Some components of the issuer server 300 may be configured using hardware elements, software elements, firmware elements, and/or a combination thereof.

The storage module 304 is configured to store machine-executable instructions to be accessed by the processing module 302. Additionally, the storage module 304 stores information related to, the contact information of the cardholders 104, a bank account number, availability of funds in the account, payment card details, transaction details, payment account details, and/or the like. Further, the storage module 304 is configured to store payment transactions associated with the cardholders 104.

The processing module 302 is configured to communicate with one or more remote devices such as a remote device 308 using the communication module 306 over a network such as the network 118 of FIG. 1. Examples of the remote device 308 include the server system 200, the payment server 114, the acquirer servers 110 or other computing systems of the issuer server 300. The communication module 306 is capable of facilitating such operative communication with the remote devices and cloud servers using Application Program Interface (API) calls. The communication module 306 is configured to receive a payment transaction request performed by the cardholder 104(1) via the network 118. The processing module 302 receives payment card information, a payment transaction amount, customer information, and merchant information from the remote device 308 (e.g., the payment server 114). The issuer server 300 includes a transaction database 310 for storing transaction data. The transaction data may include but is not limited to, transaction attributes, such as transaction amount, source of funds such as bank or credit cards, transaction channel used for loading funds such as POS terminal or ATM, preauthorization transactions, transaction velocity features such as count and transaction amount sent in the past x days to a particular cardholder (e.g., the cardholder 104(1)), transaction location information, external data sources, and other internal data to evaluate each transaction. The issuer server 300 includes a user profile database 312 storing user profiles associated with a plurality of cardholders (e.g., the cardholders 104).

The user profile data may include an account balance, a credit line, details of the cardholder 104(1), account identification information, payment card number, or the like. The details of the cardholder 104(1) may include but are not limited to, name, age, gender, physical attributes, location, registered contact number, family information, alternate contact number, registered e-mail address, or the like.

As may be understood, the issuer is responsible for either approving or declining any requests received from the cardholder 104(1), the merchant 106(1), and the token requester 122(1). As a result, the tokenization request message transmitted by the server system 200 to the issuer may be received by the issuer server 300. In other words, the issuer server 300 may receive the tokenization request message from the server system 200. In a specific embodiment, issuer server 300 may receive the tokenization request message including the risk score. As may be understood, the risk score is generated to indicate the risk corresponding to a transaction associated with the tokenization request message. The storage module 304 stores the tokenization request message and the risk score associated with it.

In one embodiment, the processing module 302 receives the risk score associated with the tokenization request message from the storage module 304. The processing module 302 may determine a tokenization eligibility of a payment card (e.g., the payment card 120(1)) based, at least in part, on the risk score associated with the tokenization request message and eligibility criteria. In a non-limiting implementation, as per the eligibility criteria, the tokenization eligibility of the payment card 120(1) is determined to be positive when the risk score is at least equal to a predefined threshold. As a result, the processing module 302 of the issuer server 300 may generate and transmit a first tokenization response message to the server system 200. Alternatively, the tokenization eligibility of the payment card 120(1) is determined to be negative when the risk score is less than the predefined threshold. As a result, the processing module 302 may generate and transmit a second tokenization response message to the server system 200. Thus, it may be understood that the issuer server 300 through the processing module 302 may generate and transmit one of the first tokenization response message and the second tokenization response message based, at least in part, on the determined tokenization eligibility of the payment card 120(1).

For instance, if the value of the risk score varies from 0 to 4, then the predefined threshold can be 2. If the risk score is at least equal to 2, then the payment card 120(1) qualifies for tokenization and the first tokenization response message may be transmitted to the server system 200. Alternatively, if the risk score is less than 2, then the payment card 120(1) is disqualified for tokenization and the second tokenization response message may be transmitted to the server system 200.

Figure 4:
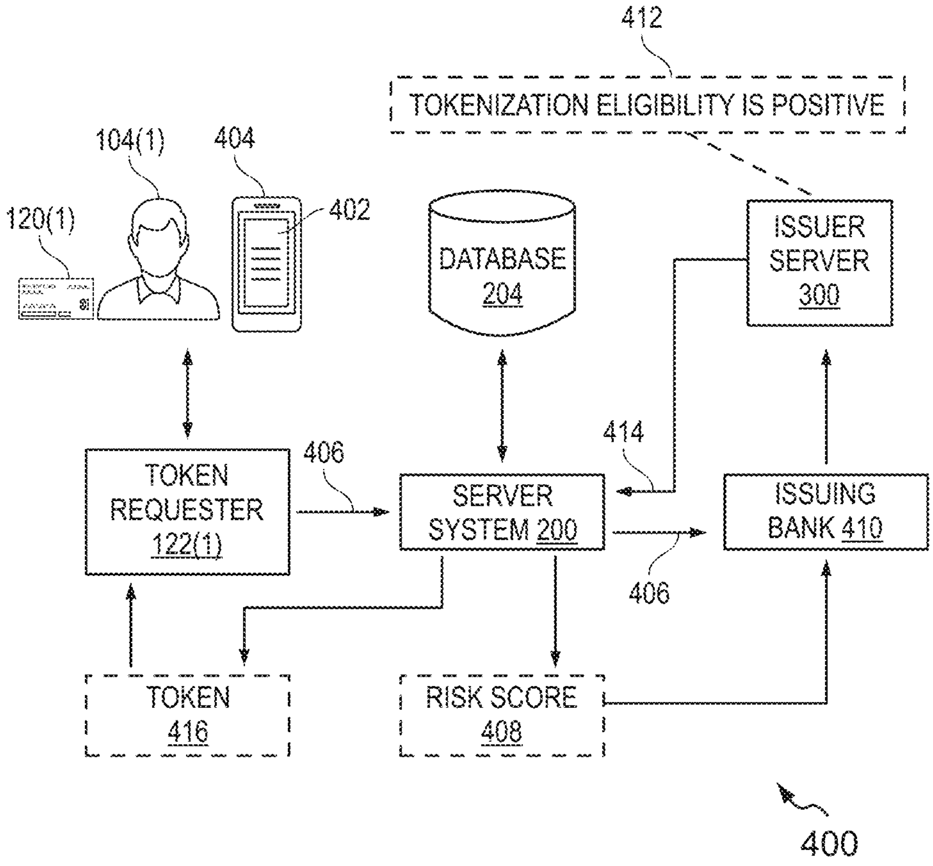
FIG. 4 illustrates a block diagram depicting an example scenario of determining a risk associated with a tokenization of a payment card, in accordance with an embodiment of the present disclosure.

FIG. 4 illustrates a block diagram depicting an example scenario 400 of determining a risk associated with a tokenization of a payment card (e.g., the payment card 120(1)), in accordance with an embodiment of the present disclosure. As per the example scenario 400, the cardholder 104(1) visits a platform 402 corresponding to a merchant such as the merchant 106(1) on an electronic device (e.g., the electronic device 404) for tokenization of a payment card such as the payment card 120(1). Thus, a tokenization request message (see, 406) is initiated as the platform 402 through the token requester 122(1). The token requester 122(1) facilitates transmission of the tokenization request message 406 to the server system 200 embedded within the payment server 114. Herein, the cardholder 104(1) can be a genuine cardholder or a fraudulent cardholder. Thus, the server system 200 is responsible for verifying the tokenization request message 406. Thus, the server system 200 is configured to determine the risk associated with the tokenization of the payment card 120(1) by generating a risk score such as the risk score 408 for the tokenization request message 406. The process of generating the risk score 408 is already explained with reference to FIGS. 1 and 2. To that end, the same is not explained again for the sake of brevity.

Further, since the issuer is responsible for approving or declining the tokenization request message 406, the server system 200 facilitates transmission of the risk score 408 including the tokenization request message 406 to the issuer such as the issuing bank 410. The issuing bank 410 or the authorities of the issuing bank 410 use the issuer server 300 for processing requests they receive from different entities in the payment network 112. Therefore, the issuer server 300 receives the tokenization request message 406 including the risk score 408. The issuer server 300 processes the tokenization request message 406 to determine the tokenization eligibility of the payment card 120(1). The process of determining the tokenization eligibility of the payment card 120(1) is already explained with reference to FIG. 3. To that end, the same is not explained again for the sake of brevity.

In the example scenario 400, the tokenization eligibility is determined to be positive (see, 412). As a result, the issuer server 300 facilitates transmission of a first tokenization response message (see, 414) to the server system 200. Since the first tokenization response message 414 is received by the server system 200, the cardholder 104(1) is determined to be a genuine cardholder and not an imposter. Further, in response to receiving the first tokenization response message 414, the server system 200 generates a token such as the token 416 for the payment card 120(1). The token 416 is linked with an identifier of the payment card 120(1) by storing the token 416 in the database 204 along with the card credential information of the payment card 120(1). Later, the token 416 is transmitted to the electronic device 404 of the cardholder 104(1) through the token requester 122(1). This token 416 can be used by the cardholder 104(1) for future tokenized transactions. During such transactions, the cardholder 104(1) is not required to enter the card credential information on the platform 402, rather entering the token 416 would be sufficient. Upon entering the token 416, the server system 200 embedded in the payment server 114 along with the issuer server 300 are responsible for verifying the authenticity of the token 416. This process is also explained later in the present disclosure.

Figure 5:
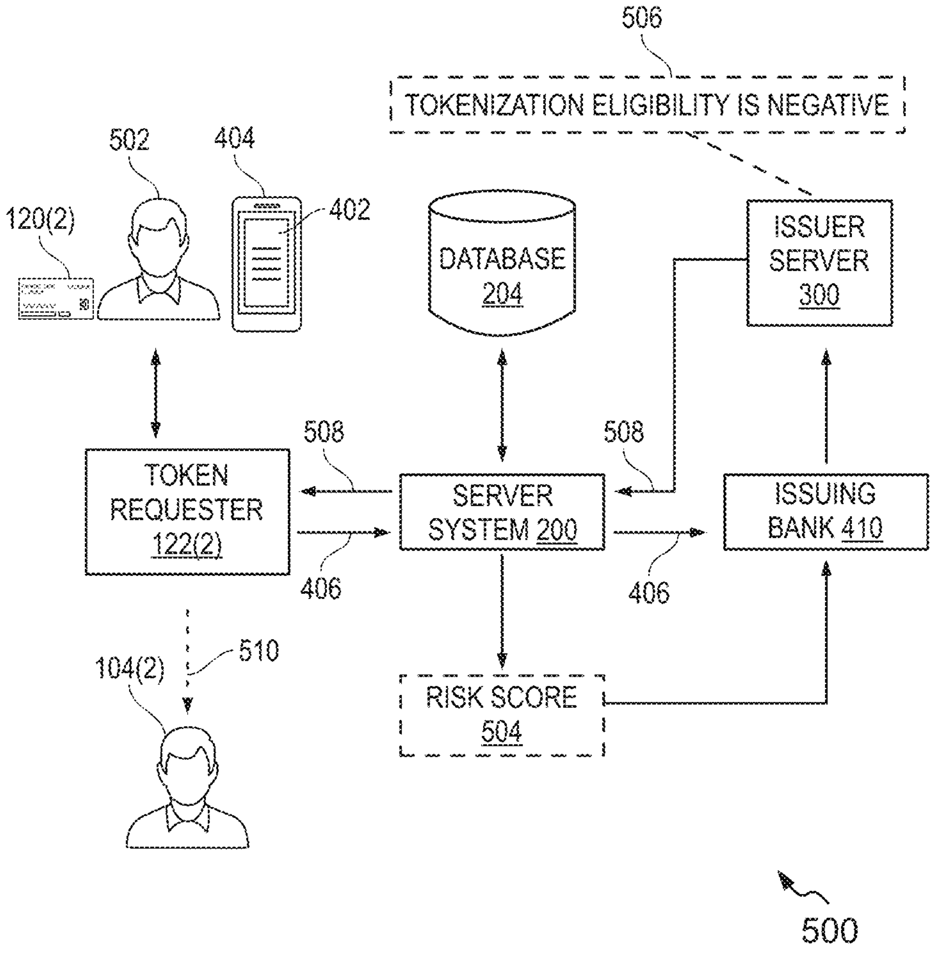
FIG. 5 illustrates a block diagram depicting another example scenario of determining the risk associated with the tokenization of the payment card, in accordance with an embodiment of the present disclosure.

FIG. 5 illustrates a block diagram depicting another example scenario 500 of determining the risk associated with the tokenization of a payment card (e.g., the payment card 120(2)), in accordance with an embodiment of the present disclosure. It is to be noted that the example scenario 500 is similar to the example scenario 400 of FIG. 4, except for the cardholder being the cardholder 502 having the payment card 120(2). Herein, the cardholder 502 is willing to tokenize the payment card 120(2). Also, the cardholder 502 is an example of the cardholders 104 described in FIG. 1. However, since it is not clear whether the cardholder 502 requesting the tokenization is genuine or not, the server system 200 is utilized to generate the risk score 504. The risk score 504 is transmitted to the issuing bank 410, which then processes the tokenization request message 406 from the token requester 122(2) using the issuer server 300.

It is to be noted that, in this example scenario 500, the risk score 504 is determined to be greater than the predefined threshold. In other words, the tokenization eligibility of the payment card 120(2) is determined to be negative (see, 506). As a result, the issuer server 300 transmitted a second tokenization response message (see, 508) to the server system 200. Since the second tokenization response message 508 is received by the server system 200, the cardholder 502 is determined to be an imposter. Further, in response to receiving the second tokenization response message 508, the server system 200 facilitates transmission of the second tokenization response message 508 to the token requester 122(2). This is followed by transmitting an alert (see, 510) to notify about the attempt-to-tokenization attack to a cardholder such as the cardholder 104(2) who is a genuine user of the payment card 120(2). This notification alerts the cardholder 104(2) about the attack so that the cardholder 104(2) can take preventive measures to avoid such attacks in the future. The preventive measures can include re-digitizing the payment card 120(2) with a new token, improving security, deleting or blocking some of the existing tokens of the payment card 120(2) on different merchants of the merchants 106, or the like.

Figure 6:
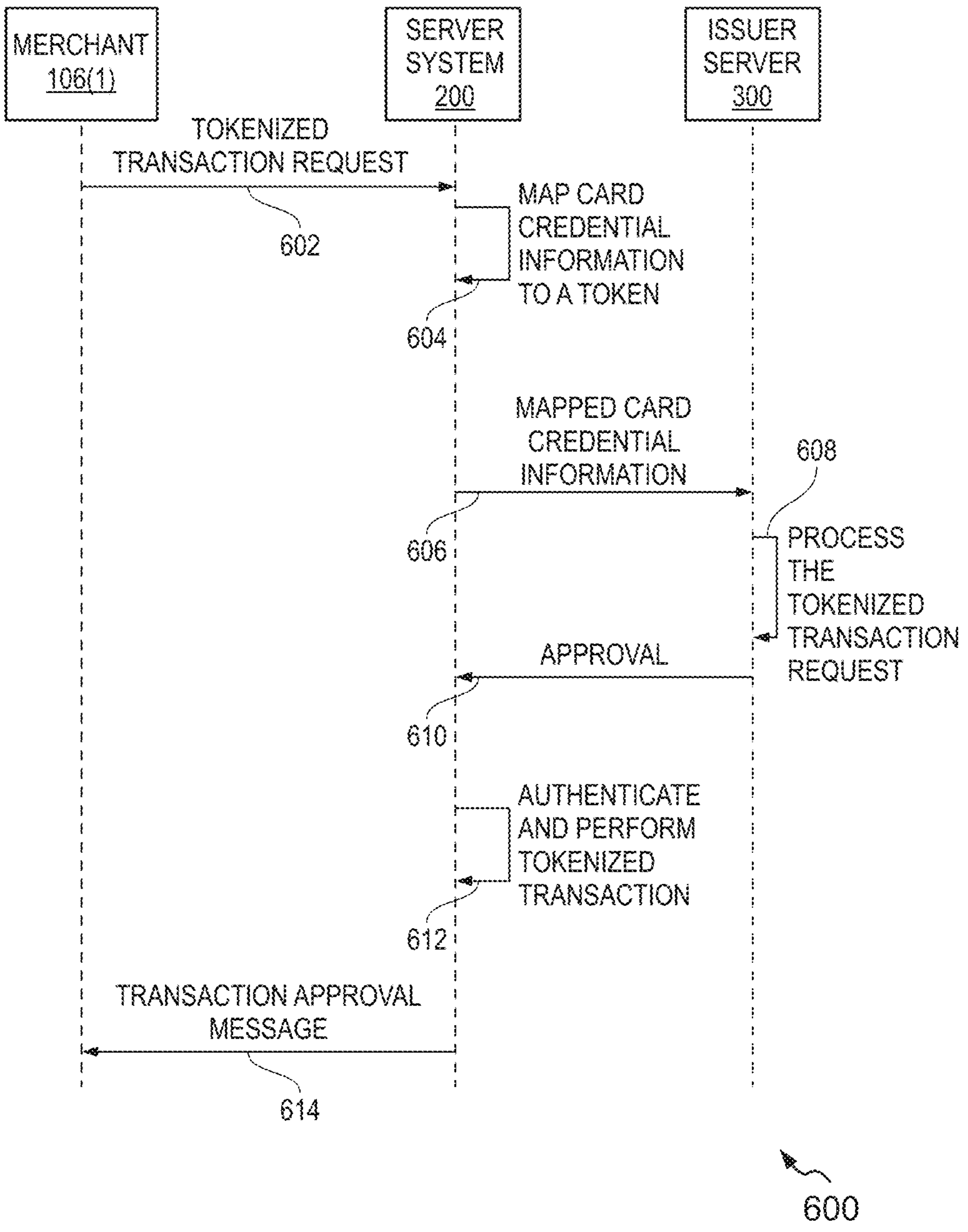
FIG. 6 illustrates a sequence flow diagram depicting a process of managing a tokenized payment transaction, in accordance with an embodiment of the present disclosure.

FIG. 6 illustrates a sequence flow diagram depicting a process 600 of managing a tokenized payment transaction, in accordance with an embodiment of the present disclosure. As may be understood, upon successfully generating a token (e.g., the token 416) for the payment card 120(1) of the cardholder 104(1), the token 416 can be used for performing future payment transactions. The transactions that may be performed using the token 416 may be referred to as tokenized payment transactions. For example, the cardholder 104(1) visits a platform such as the platform 402 provided by a merchant (e.g., the merchant 106(1)) for purchasing an item. As the cardholder 104(1) has created the token 416 and saved the payment card 120(1) on the platform 402 as the token 416, the cardholder 104(1) does not have to enter the card details, such as the PAN, CVV, card number, and the like on the platform 402. The transaction for purchasing the item can be completed by merely using the token 416. The sequence of operations that needs to be performed when a tokenized transaction is initiated is as follows and starts from step 602.

At 602, the tokenized transaction is initiated on the platform 402 of the merchant 106(1). Upon initiation of the tokenized transaction, a tokenized transaction request is generated at the platform 402 of the merchant 106(1). This request is transmitted to the server system 200. Thus, it may be understood that the server system 200 is configured to receive the tokenized transaction request indicative of the tokenized transaction initiated at the merchant 106(1) by a user such as the cardholder 104(2). Herein, the tokenized transaction request includes transaction information and the token 416. In various examples, the transaction information can include a transaction amount, a timestamp associated with the transaction, a merchant ID, item-related details, and the like.

At 604, in response to receiving the tokenized transaction request from the merchant 106(1), the server system 200 is configured to map the card credential information corresponding to the token 416 in the database 204. In other words, the server system 200 searches for the card credential information linked to the token 416 in the database 204, which was stored during the tokenization of the payment card 120(1) using which the cardholder 104(1) purchases the item.

At 606, upon finding the card credential information that is linked to the token 416, the server system 200 is configured to facilitate transmission of the mapped card credential information to the issuer (e.g., the issuing bank 410) for an approval of the tokenized transaction request. In one embodiment, the issuing bank 410 is associated with the issuer server 300 which processes and authorizes every transaction request it receives. Thus, upon receiving the mapped card credential information from the server system 200, the issuing bank 410 or the authorities at the issuing bank 410 transmit this information to the issuer server 300 for processing.

At 608, the issuer server 300 is configured to process the mapped card credential information received from the server system 200. Generally, the issuer server 300 is responsible for authorizing the identity of the cardholder 104(1). In order to do so, upon receiving any transaction request from the payment server 114 or the server system 200, the issuer server 300 compares the received information with pre-stored information about the cardholder 104(1). In some scenarios, the issuer server 300 may send a One-time password (OTP) to the cardholder 104(1) on their electronic device (e.g., the electronic device 404) through the network 118. The cardholder 104(1) may have to enter this OTP on the platform 402 of the merchant 106(1) from whom they are purchasing the item. The merchant 106(1) internally transmits this OTP to the issuer server 300 through the payment server 114. The issuer server 300 compares the OTP that was shared with the cardholder 104(1) with the one received from the merchant 106(1), to verify whether the entity requesting the tokenized transaction is the authorized cardholder 104(1) and not any imposter. This step can be referred to as an identification and verification step of an authorization step. In some other scenarios, the issuer server 300 may not send the OTP to the cardholder 104(1) for identification and verification as more trust is placed in the token 416. However, the issuer server 300 at least verifies the transaction information received with the token 416 while processing the tokenized transaction request. If the issuer server 300 finds the transaction information to be genuine, the issuer server 300 may approve the tokenized transaction. Alternatively, the issuer server 300 may reject the tokenized transaction.

At 610, the server system 200 is configured to receive an approval (or an approval message) for the tokenized transaction from the issuer server 300. In case of rejection, the server system 200 may receive a refusal (or a refusal message) for the tokenized transaction from the issuer server 300.

At 612, in response to receiving the approval from the issuer server 300, the server system 200 is configured to authenticate the tokenized transaction. Upon authentication of the tokenized transaction, the tokenized transaction may be performed.

At 614, the server system 200 may generate and transmit a transaction approval message for the tokenized transaction request to the merchant 106(1). The transaction approval message is indicative of a successful completion of the tokenization transaction initiated at the merchant 106(1) for purchasing the item. Upon receiving the transaction approval message, the platform 402 displays the successful completion of the tokenized transaction to the cardholder 104(1) on their electronic device such as the electronic device 404. After this, the shipment process of the item may be initiated, the progress of which is also accessible to the cardholder 104(1) on the platform 402 of the merchant 106(1). Alternatively, if the server system 200 may have received the refusal message from the issuer server 300, the server system 200 may have generated and transmitted a transaction denial message to the merchant 106(1). Upon receiving the transaction denial message, the platform 402 may display that the tokenized transaction is unsuccessful to the cardholder 104(1) on their electronic device 404. As a result, the cardholder 104(1) fails to purchase the item that was added to the cart earlier, using the token 416. This may happen in several scenarios, such as if the token is wrongly entered, if the cardholder 104(1) failed in the identification and verification step performed by the issuer server 300, if the card credential information is not found in the database 204 that is linked to the token 416 if the token 416 has expired, if the token 416 is blocked or disabled, or the like.

Figure 7:
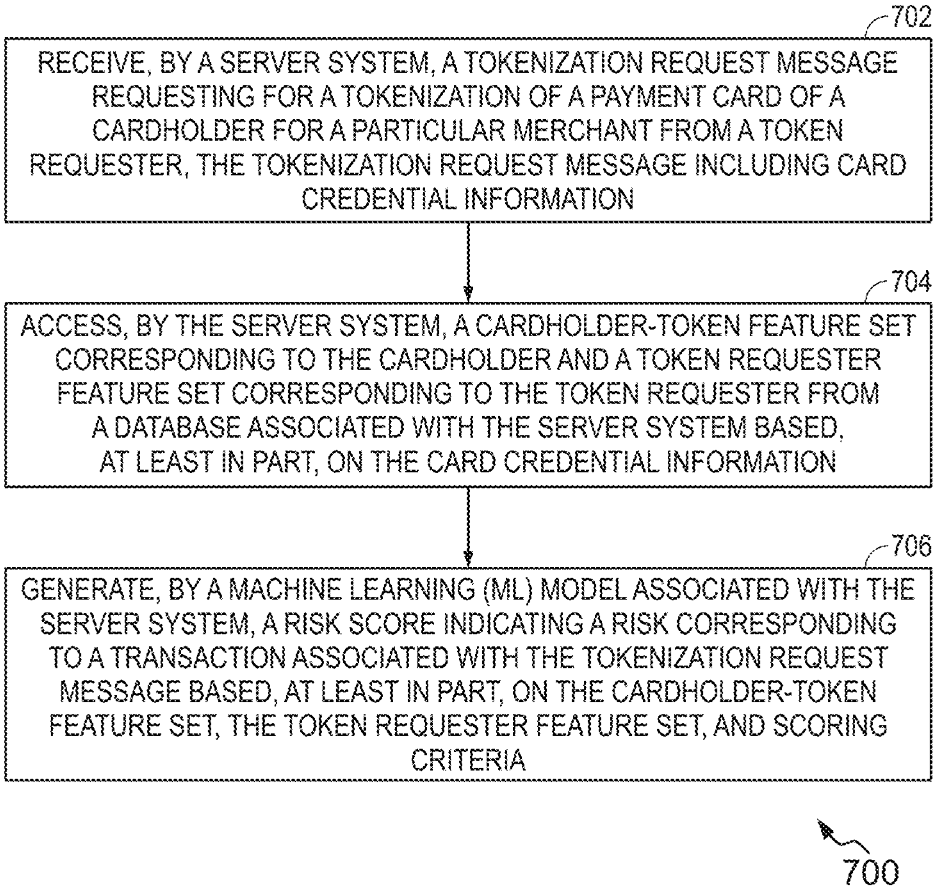
FIG. 7 illustrates a flow diagram depicting a method for determining risk associated with tokenization of payment cards, in accordance with an embodiment of the present disclosure.

FIG. 7 illustrates a flow diagram depicting a method 700 for determining risk associated with a tokenization of payment cards (e.g., the payment cards 120), in accordance with an embodiment of the present disclosure. The method 700 depicted in the flow diagram may be executed by, for example, the server system 200. The sequence of operations of the method 700 may not be necessarily executed in the same order as they are presented. Further, one or more operations may be grouped and performed in the form of a single step, or one operation may have several sub-steps that may be performed in parallel or in a sequential manner. Operations of the method 700, and combinations of operations in the method 700 may be implemented by, for example, hardware, firmware, a processor, circuitry, and/or a different device associated with the execution of software that includes one or more computer program instructions. The plurality of operations is depicted in the process flow of the method 700. The process flow starts at operation 702.

At operation 702, the method 700 includes receiving, by a server system (e.g., the server system 200), a tokenization request message (e.g., the tokenization request message 406) requesting for a tokenization of a payment card (e.g., the payment card 120(1)) of a cardholder (e.g., the cardholder 104(1)) for a particular merchant (e.g., the merchant 106(1)) from a token requester (e.g., the token requester 122(1)). Herein, the tokenization request message 406 may include card credential information.

At operation 704, the method 700 includes accessing, by the server system 200, a cardholder-token feature set corresponding to the cardholder 104(1) and a token requester feature set corresponding to the token requester 122(1) from a database (e.g., the database 204) associated with the server system 200 based, at least in part, on the card credential information.

At operation 706, the method 700 includes generating, by a Machine Learning (ML) model (e.g., the ML model 226) associated with the server system 200, a risk score (e.g., the risk score 408 or 504) indicating a risk corresponding to a transaction associated with the tokenization request message 406 based, at least in part, on the cardholder-token feature set, the token requester feature set, and scoring criteria.

Figure 8:
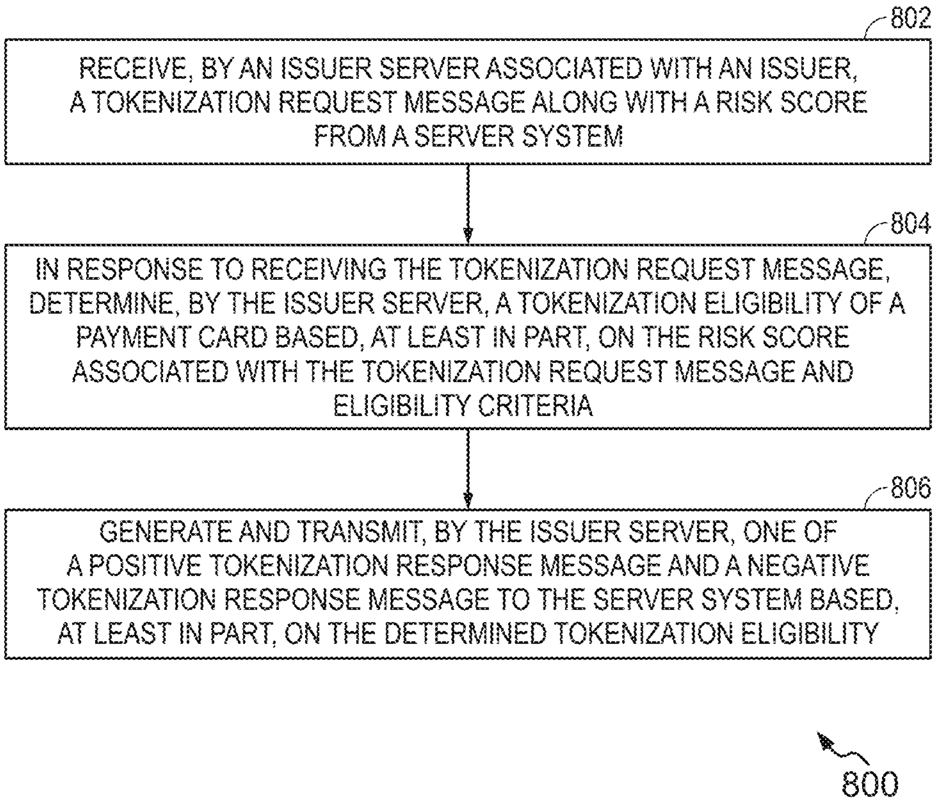
FIG. 8 illustrates a flow diagram depicting a method for determining a tokenization eligibility of a payment card, in accordance with an embodiment of the present disclosure.

FIG. 8 illustrates a flow diagram depicting a method 800 for determining a tokenization eligibility of a payment card (e.g., the payment card 120(1)), in accordance with an embodiment of the present disclosure. The method 800 depicted in the flow diagram may be executed by, for example, the issuer server 300. The sequence of operations of the method 800 may not be necessarily executed in the same order as they are presented. Further, one or more operations may be grouped and performed in the form of a single step, or one operation may have several sub-steps that may be performed in parallel or in a sequential manner. Operations of the method 800, and combinations of operations in the method 800 may be implemented by, for example, hardware, firmware, a processor, circuitry, and/or a different device associated with the execution of software that includes one or more computer program instructions. The plurality of operations is depicted in the process flow of the method 800. The process flow starts at operation 802.

At operation 802, the method 800 includes receiving, by an issuer server (e.g., the issuer server 300) associated with an issuer (e.g., the issuing bank 410), a tokenization request message (e.g., the tokenization request message 406) including a risk score (e.g., the risk score 408 or 504) from a server system (e.g., the server system 200).

At operation 804, the method 800 includes in response to receiving the tokenization request message 406, determining, by the issuer server 300, a tokenization eligibility of a payment card (e.g., the payment card 120(1)) based, at least in part, on the risk score 408 or 504 associated with the tokenization request message 406 and eligibility criteria.

At operation 806, the method 800 includes generating and transmitting, by the issuer server 300, one of a first tokenization response message (e.g., the first tokenization response message 414) and a second tokenization response message (e.g., the second tokenization response message 508) to the server system 200 based, at least in part, on the determined tokenization eligibility.

Figure 9:
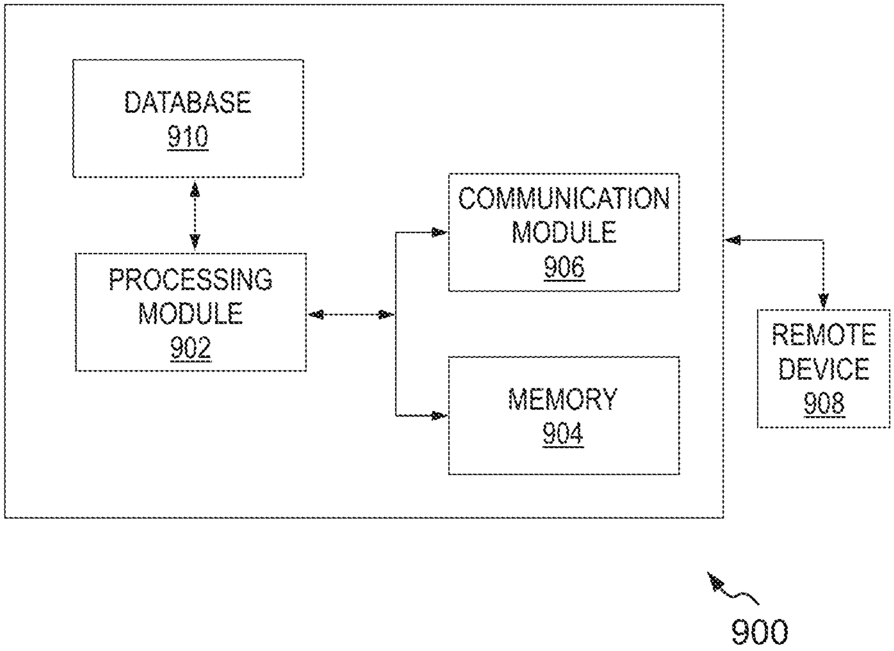
FIG. 9 illustrates a simplified block diagram of a payment server, in accordance with an embodiment of the present disclosure.

FIG. 9 illustrates a simplified block diagram of a payment server 900, in accordance with an embodiment of the present disclosure. The payment server 900 is an example of the payment server 114 of FIG. 1. The payment server 900 and the server system 200 may use the payment network 112 as a payment interchange network.

The payment server 900 includes a processing module 902 configured to extract programming instructions from a memory 904 to provide various features of the present disclosure. The components of the payment server 900 provided herein may not be exhaustive, and the payment server 900 may include more or fewer components than that depicted in FIG. 9. Further, two or more components may be embodied in one single component, and/or one component may be configured using multiple sub-components to achieve the desired functionalities. Some components of the payment server 900 may be configured using hardware elements, software elements, firmware elements, and/or a combination thereof.

Via a communication module 906, the processing module 902 receives a request from a remote device 908, such as the issuer servers 108, the acquirer servers 110, or the server system 102 as shown in FIG. 1. The request may be a request for conducting the payment transaction. The communication may be achieved through API calls, without loss of generality. The payment server 900 includes a database 910. The database 910 also includes transaction processing data, such as issuer ID, country code, acquirer ID, and merchant ID (MID), among others.

When the payment server 900 receives a payment transaction request from the acquirer servers 110 or a payment terminal (e.g., Internet of Things (IOT) device), the payment server 900 may route the payment transaction request to the issuer servers 108. The database 910 stores transaction identifiers for identifying transaction details, such as transaction amount, IoT device details, acquirer account information, transaction records, merchant account information, and the like.

In one example embodiment, the acquirer servers 110 is configured to send an authorization request message to the payment server 900. The authorization request message includes, but is not limited to, the payment transaction request.

The processing module 902 further sends the payment transaction request to the issuer servers 108 for facilitating the payment transactions from the remote device 908. The processing module 902 is further configured to notify the remote device 908 of the transaction status in the form of an authorization response message via the communication module 906. The authorization response message includes but is not limited to, a payment transaction response received from the issuer servers 108. Alternatively, in one embodiment, the processing module 902 is configured to send an authorization response message for declining the payment transaction request, via the communication module 906, to the acquirer servers 110. In one embodiment, the processing module 902 executes similar operations performed by the server system 200, however, for the sake of brevity, these operations are not explained herein.

The disclosed method with reference to FIGS. 7 and 8, or one or more operations of the server system 200 and the issuer server 300 may be implemented using software including computer-executable instructions stored on one or more computer-readable media (e.g., non-transitory computer-readable media, such as one or more optical media discs, volatile memory components (e.g., Dynamic Random Access Memory (DRAM) or Statis Random Access Memory (SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication modes. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad scope of the invention. For example, the various operations, blocks, etc., described herein may be enabled and operated using hardware circuitry (for example, Complementary Metal Oxide Semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, Application-Specific Integrated Circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media. Examples of non-transitory computer-readable media include magnetic storage media (such as floppy disks, magnetic tapes, hard disk drives, etc.), optical magnetic storage media (e.g. magneto-optical disks), Compact Disc Read-Only Memory (CD-ROM), Compact Disc Recordable CD-R, Compact Disc Rewritable CD-R/W), Digital Versatile Disc (DVD), and semiconductor memories (such as mask ROM, programmable ROM (PROM), Erasable PROM (EPROM), flash memory, Random Access Memory (RAM), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different from those which are disclosed. Therefore, although the invention has been described based on these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:

receiving, by a server system, a tokenization request message requesting for a tokenization of a payment card of a cardholder for a particular merchant from a token requester, the tokenization request message comprising card credential information;

accessing, by the server system, a cardholder-token feature set corresponding to the cardholder and a token requester feature set corresponding to the token requester from a database associated with the server system based, at least in part, on the card credential information;

weighting, by a Machine Learning (ML) model associated with the server system, feature contributions using learned model parameters derived from historical tokenized transaction data, the learned model parameters having been adjusted, until a convergence criteria are met during training, based on predicted probability scores, true labels including pseudo labels assigned to tokenized transactions identified as fraudulent within a predefined interval following token provisioning, and a loss function that was iteratively minimized with respect to the learned model parameters until the convergence criteria are satisfied; and generating, by the ML model associated with the server system, a risk score indicating a risk corresponding to a transaction associated with the tokenization request message based, at least in part, on the cardholder-token feature set, the token requester feature set, and scoring criteria.

2. The computer-implemented method as claimed in claim 1, further comprising:

facilitating, by the server system, transmission of the tokenization request message comprising the risk score to an issuer associated with the payment card for an approval for the tokenization of the payment card;

in response to receiving a t first tokenization response message indicative of an approval for the tokenization from the issuer, generating, by the server system, a token for the payment card, wherein the token is generated randomly;

extracting, by the server system, the card credential information of the payment card from the tokenization request message;

linking and storing, by the server system, an identifier of the payment card with the corresponding token in the database, based at least on the card credential information; and facilitating, by the server system, transmission of the token linked with the identifier of the payment card to the token requester.

3. The computer-implemented method as claimed in claim 2, further comprising:

in response to receiving a second tokenization response message indicative of a refusal for the tokenization from the issuer, facilitating, by the server system, transmission of the second tokenization response message to the token requester.

4. The computer-implemented method as claimed in claim 3, further comprising:

generating and transmitting, by the server system, an alert to the cardholder of the payment card based, at least in part, on the second tokenization response message and the card credential information associated with the payment card.

5. The computer-implemented method as claimed in claim 1, further comprising:

accessing, by the server system, a training feature set for each transaction from the database based, at least in part, on the cardholder-token feature set and the token requester feature set for each transaction; and training, by the server system, the ML model to generate the risk score for the transaction associated with the tokenization request message, wherein training the ML model comprises iteratively performing until convergence criteria are met, a set of operations comprising:

initializing the ML model based, at least in part, on one or more model parameters;

generating, by the ML model, a predicted probability score for each transaction based, at least in part, on the training feature set and the one or more model parameters, the predicted probability score indicating a likelihood of the transaction being risky;

computing, by the ML model, a loss for each transaction based, at least in part, on the predicted probability score, true labels, and the loss function; and optimizing the one or more model parameters based, at least in part, on back-propagation of the loss.

6. The computer-implemented method as claimed in claim 1, wherein generating the risk score further comprising:

generating, by the ML model, a predicted probability score based, at least in part, on the cardholder-token feature set and the token requester feature set, the predicted probability score indicative of a likelihood of the transaction associated with the tokenization request message being risky; and generating the risk score for the transaction associated with the tokenization request message based, at least in part, on the predicted probability score and the scoring criteria.

7. The computer-implemented method as claimed in claim 1, further comprising:

receiving, by the server system, a tokenized transaction request indicative of a tokenized transaction initiated at a merchant by a user, the tokenized transaction request comprising transaction information and a token;

mapping, by the server system, card credential information corresponding to the token in the database;

facilitating, by the server system, transmission of the mapped card credential information to the issuer for an approval of the tokenized transaction request;

in response to receiving the approval from the issuer, authenticating, by the server system, the tokenized transaction; and generating and transmitting, by the server system, a transaction approval message for the tokenized transaction request to the merchant.

8. The computer-implemented method as claimed in claim 7, further comprising:

in response to receiving a refusal from the issuer, generating and transmitting, by the server system, a transaction denial message to the merchant.

9. The computer-implemented method as claimed in claim 1, further comprising:

accessing, by the server system, tokenized transaction information associated with the payment card from the database, the tokenized transaction information comprising information related to a plurality of tokenized transactions performed using the payment card with a plurality of merchants, each tokenized transaction utilizing a unique token linked to the identifier of the payment card for each merchant;

determining, by the server system, a fraudulent tokenized transaction set from the plurality of tokenized transactions based, at least in part, on fraudulent behavior information associated with each of the plurality of tokenized transactions; and generating and assigning, by the server system, a pseudo label to each fraudulent tokenized transaction of the fraudulent tokenized transaction set based, at least in part, on the fraudulent behavior information and labeling criteria, the pseudo label indicating that the fraudulency of the fraudulent tokenized transaction is due to an attempt-to-tokenization attack.

10. The computer-implemented method as claimed in claim 9, further comprising:

updating, by the server system, the cardholder-token feature set based, at least in part, on the pseudo label assigned to each fraudulent tokenized transaction.

11. The computer-implemented method as claimed in claim 1, wherein the server system is a payment server associated with a payment network.

12. A server system, comprising:

a communication interface;

a memory comprising executable instructions; and a processor communicably coupled to the communication interface and the memory, the processor configured to cause the server system to at least:

receive a tokenization request message requesting for a tokenization of a payment card of a cardholder for a particular merchant from a token requester, the tokenization request message comprising card credential information;

access a cardholder-token feature set corresponding to the cardholder and a token requester feature set corresponding to the token requester from a database associated with the server system based, at least in part, on the card credential information;

weight, by a Machine Learning (ML) model associated with the server system, feature contributions using learned model parameters derived from historical tokenized transaction data, the learned model parameters having been adjusted, until a convergence criteria are met during training, based on predicted probability scores, true labels including pseudo labels assigned to tokenized transactions identified as fraudulent within a predefined interval following token provisioning, and a loss function that was iteratively minimized with respect to the learned model parameters until the convergence criteria are satisfied; and generate, by the ML model associated with the server system, a risk score indicating a risk corresponding to a transaction associated with the tokenization request message based, at least in part, on the cardholder-token feature set, the token requester feature set, and scoring criteria.

13. The server system as claimed in claim 12, wherein the server system is further caused, at least in part, to:

facilitate transmission of the tokenization request message comprising the risk score to an issuer associated with the payment card for an approval for the tokenization of the payment card;

in response to receiving a first tokenization response message indicative of an approval for the tokenization from the issuer, generate a token for the payment card, wherein the token is generated randomly;

extract the card credential information of the payment card from the tokenization request message;

link and store an identifier of the payment card with the corresponding token in the database, based at least on the card credential information; and facilitate transmission of the token linked with the identifier of the payment card to the token requester.

14. The server system as claimed in claim 13, wherein the server system is further caused, at least in part, to in response to receiving a second tokenization response message indicative of a refusal for the tokenization from the issuer, facilitate transmission of the second tokenization response message to the token requester.

15. The server system as claimed in claim 14, wherein the server system is further caused, at least in part, to generate and transmit an alert to the cardholder of the payment card based, at least in part, on the second tokenization response message and the card credential information associated with the payment card.

16. The server system as claimed in claim 12, wherein the server system is caused, at least in part, to:

access a training feature set for each transaction from the database based, at least in part, on the cardholder-token feature set and the token requester feature set for each transaction; and train the ML model to generate the risk score for the transaction associated with the tokenization request message, wherein training the ML model comprises iteratively performing until convergence criteria are met, a set of operations comprising:

initializing the ML model based, at least in part, on one or more model parameters;

generating, by the ML model, a predicted probability score for each transaction based, at least in part, on the training feature set and the one or more model parameters, the predicted probability score indicating a likelihood of the transaction being risky;

computing, by the ML model, a loss based, at least in part, on the predicted probability score, true labels, and the loss function; and optimizing the one or more model parameters based, at least in part, on back-propagation of the loss.

17. The server system as claimed in claim 12, wherein to generate the risk score, the server system is further caused, at least in part, to:

generate, by the ML model, a predicted probability score based, at least in part, on the cardholder-token feature set and the token requester feature set, the predicted probability score indicative of a likelihood of the transaction associated with the tokenization request message being risky; and generate the risk score for the transaction associated with the tokenization request message based, at least in part, on the predicted probability score and the scoring criteria.

18. The server system as claimed in claim 12, wherein the server system is further caused, at least in part, to:

receive a tokenized transaction request indicative of a tokenized transaction initiated at a merchant by a user, the tokenized transaction request comprising transaction information and a token;

map card credential information corresponding to the token in the database;

facilitate transmission of the mapped card credential information to the issuer for an approval of the tokenized transaction request;

in response to receiving the approval from the issuer, authenticate the tokenized transaction; and generate and transmit a transaction approval message for the tokenized transaction request to the merchant.

19. The server system as claimed in claim 12, wherein the server system is further caused, at least in part, to:

access tokenized transaction information associated with the payment card from the database, the tokenized transaction information comprising information related to a plurality of tokenized transactions performed using the payment card with a plurality of merchants, each tokenized transaction utilizing a unique token linked to the identifier of the payment card for each merchant;

determine a fraudulent tokenized transaction set from the plurality of tokenized transactions based, at least in part, on fraudulent behavior information associated with each of the plurality of tokenized transactions; and generate and assign, by the server system, a pseudo label to each fraudulent tokenized transaction of the fraudulent tokenized transaction set based, at least in part, on the fraudulent behavior information and labeling criteria, the pseudo label indicating that the fraudulency of the fraudulent tokenized transaction is due to an attempt-to-tokenization attack.

20. A non-transitory computer-readable storage medium comprising computer-executable instructions that, when executed by at least a processor of a server system, cause the server system to perform a method comprising:

receiving a tokenization request message requesting for a tokenization of a payment card of a cardholder for a particular merchant from a token requester, the tokenization request message comprising card credential information;

accessing a cardholder-token feature set corresponding to the cardholder and a token requester feature set corresponding to the token requester from a database associated with the server system based, at least in part, on the card credential information;

weighting, by a Machine Learning (ML) model associated with the server system, feature contributions using learned model parameters derived from historical tokenized transaction data, the learned model parameters having been adjusted, until a convergence criteria are met during training, based on predicted probability scores, true labels including pseudo labels assigned to tokenized transactions identified as fraudulent within a predefined interval following token provisioning, and a loss function that was iteratively minimized with respect to the learned model parameters until the convergence criteria are satisfied; and generating, by the ML model associated with the server system, a risk score indicating a risk corresponding to a transaction associated with the tokenization request message based, at least in part, on the cardholder-token feature set, the token requester feature set, and scoring criteria.

* * * * *